US007644392B2

(12) United States Patent
Geipel et al.

(10) Patent No.: US 7,644,392 B2
(45) Date of Patent: Jan. 5, 2010

(54) SYSTEM AND METHOD FOR ACTIVE CONFIGURATION MANAGEMENT

(75) Inventors: Barry L. Geipel, Diamond Bar, CA (US); Philip Steven Alexander Smith, Lake Forest, CA (US); Patrick C. Crane, Huntington Beach, CA (US); Jay C. Gillibrand, Irvine, CA (US); Darcy L. Wiborg Weber, Mission Viejo, CA (US)

(73) Assignee: Telelogic Technologies North America, Inc., Irvine, CA (US)

( * ) Notice: Subject to any disclaimer, the term of this patent is extended or adjusted under 35 U.S.C. 154(b) by 1690 days.

(21) Appl. No.: 10/121,976

(22) Filed: Apr. 12, 2002

(65) Prior Publication Data
US 2003/0200098 A1 Oct. 23, 2003

Related U.S. Application Data

(60) Provisional application No. 60/372,098, filed on Apr. 12, 2002.

(51) Int. Cl.
*G06F 9/45* (2006.01)
(52) U.S. Cl. ........................................ 717/121
(58) Field of Classification Search .......... 717/121–124
See application file for complete search history.

(56) References Cited

U.S. PATENT DOCUMENTS

| 5,649,200 | A | | 7/1997 | Leblang et al. |
|---|---|---|---|---|
| 5,675,802 | A | | 10/1997 | Allen et al. |
| 5,752,245 | A | | 5/1998 | Parrish et al. |
| 5,805,889 | A | * | 9/1998 | Van De Vanter ............ 717/107 |
| 5,995,753 | A | * | 11/1999 | Walker ....................... 717/108 |
| 6,126,329 | A | | 10/2000 | Bennett et al. |
| 6,167,534 | A | | 12/2000 | Straathof et al. |
| 6,182,286 | B1 | * | 1/2001 | Sigal et al. .................. 717/122 |
| 6,206,584 | B1 | * | 3/2001 | Hastings ...................... 714/35 |
| 6,236,977 | B1 | | 5/2001 | Verba et al. |
| 6,256,773 | B1 | | 7/2001 | Bowman-Amuah |
| 6,263,457 | B1 | | 7/2001 | Anderson et al. |
| 6,336,217 | B1 | | 1/2002 | D'Anjou et al. |
| 2003/0149756 | A1 | * | 8/2003 | Grieve et al. ................ 709/223 |

\* cited by examiner

*Primary Examiner*—John Chavis
(74) *Attorney, Agent, or Firm*—Brian J Colandreo, Esq.; Holland & Knight LLP

(57) ABSTRACT

A system and method for active configuration management of the components of a data repository maintained in memory of a computer system is disclosed herein. The method includes creating a plurality of file system event objects in response to the occurrence of a corresponding plurality of events associated with ones of the components. A plurality of file system event objects are then entered into an event queue. Next, a sequence of configuration management (CM) operations involving identified ones of the components are executed on the basis of corresponding ones of the file system event objects.

23 Claims, 20 Drawing Sheets

SYSTEM AND METHOD FOR ACTIVE CONFIGURATION MANAGEMENT

CROSS-REFERENCE TO RELATED APPLICATIONS

This application is related to U.S. Provisional Patent Application No. 60/372,098, filed Apr. 12, 2002, which is hereby incorporated herein by reference.

FIELD OF THE INVENTION

The present invention relates to version management of multi-module systems and, in particular, actively and automatically managing revision of the modules of such systems during the development process.

BACKGROUND OF THE INVENTION

As is well known, both the hardware and the software incorporated within modern computer systems are considerable more complex than in years past. In early incarnations of computer systems, the hardware often consisted of a single processor configured to execute software programs that were typically relatively small and generally comprised only a single text file of source code.

Paralleling the increase in sophistication and complexity of the hardware components of modern computer systems, software programs have also become larger and more complex. In addition, software programs are now typically organized into a plurality of cooperative modules. Organizing a software program into a number of modules enable each such module to be separately compiled into object code, which may typically be effected in significantly less time than compiling an entire program. In addition, modular programming has permitted segments of code to be reused both within a given program as well as between separate programs.

However, the general acceptance of modular programming techniques has created a concomitant need a need for methods of generating and maintaining versions of complex software programs composed of a plurality of modules, each of which is capable of being edited by multiple users. For a rather prolonged period, there was little development of automated "configuration management" or "version control" software to address this need. Rather, documentation and control of current versions of software programs was generally painstakingly accomplished using manual configuration management techniques.

One early approach to automated configuration management involved maintenance of references between the source code files of program modules within a centralized "project" file. The project file generally contains a record such source code files along with references between the files and a current "state" of each file. Generally, a date and time stamp is applied to each source code file upon modification of the file. When this approach to configuration management is employed, compiling of the program involves performing a "build" during which all source code files in the project database which need recompiling are sequentially compiled. During each such subsequent "build" operation, the configuration management software compares the time stamp of each source code file to a time stamp corresponding the most recent build operation. Those source codes files which have a time stamp later than the last build date are recompiled before linking.

Although the project file approach may lead to satisfactory results for programs comprises of relatively small numbers of modules edited by a relatively few number of users, in larger projects various difficulties may arise. For example, because this approach provides no meaningful coordination between editing and "versioning" of program modules (which is typically effected only when the configuration management systems is invoked by users), a number of configuration management errors have been found to frequently arise. One such error occurs when multiple users happen to simultaneously edit a single file. Another error occurs when unsaved buffers or work areas are not incorporated in a new version of the program created during a build operation, which is one of the adverse consequences which may arise when the contents of a work area do not remain synchronized with the file repository of the configuration management system. In addition, new files created by a user may be lost if the user does not inform the configuration management system of the existence of such files.

These difficulties associated with current approaches to configuration management are exacerbated by the fact that software is being developed more quickly than ever before. Integrated development tools and environments enable rapid prototyping of complex applications, and tools often are used to generate application code. Software that once took months or years to develop can be put together in just weeks or even days. However, modern software tools often conceal from the software developer information concerning the number and names of files produced during the development process. When utilizing existing configuration management systems, it is generally incumbent upon the software developer to fully understand the nature of the files being created and to appropriately interact with the configuration management system in order to properly control such files. When large number of such software "artifact" files are created during the development process, management of the aggregate set of files associated with a given development project may become unduly burdensome.

For these and other reasons, existing configuration management systems are often seen as a hindrance in this environment of rapid application development. That is, the engineers and other professionals engaged in software development often view configuration management simply as a way of backing up work or of aiding other members of the software development team (e.g., "build managers" or "testers"). Software developers have shown reticence in invoking a configuration management system each time a new file generated, or when an existing file is modified or renamed. In short, software developers are typically loathe to spend time interacting with configuration management systems, and would likely be receptive to a configuration management system that is more automatic and less intrusive.

SUMMARY OF THE INVENTION

In summary, the present invention relates to a method for active configuration management of the components of a data repository maintained in memory of a computer system. The method includes creating a plurality of file system event objects in response to the occurrence of a corresponding plurality of events associated with ones of the components. A plurality of file system event objects are then entered into an event queue. Next, a sequence of configuration management (CM) operations involving identified ones of the components are executed on the basis of corresponding ones of the file system event objects.

In an exemplary implementation, the method includes setting a result time upon entry of a first of the file system event objects into the event queue, wherein the first of the file system event objects is transferred from the event queue to a command queue upon expiration of the result time. New file system event objects may also be created based upon first and second related ones of the file system event objects. Each new file system event object serves to replace the first and second related file system event objects upon which it is based, and is inserted into a predefined position within the event queue.

BRIEF DESCRIPTION OF THE DRAWINGS

For a better understanding of the nature of the features of the invention, reference should be made to the following detailed description taken in conjunction with the accompanying drawings, in which.

DETAILED DESCRIPTION OF THE INVENTION

The present invention facilitates active configuration management of complex software systems comprised of a plurality of components or objects including, without limitation, computer programs, databases, and text documents. Such complex software systems, which are typically subdivided into pluralities of subcomponents, are often developed and modified by multiple users.

Figure 1:
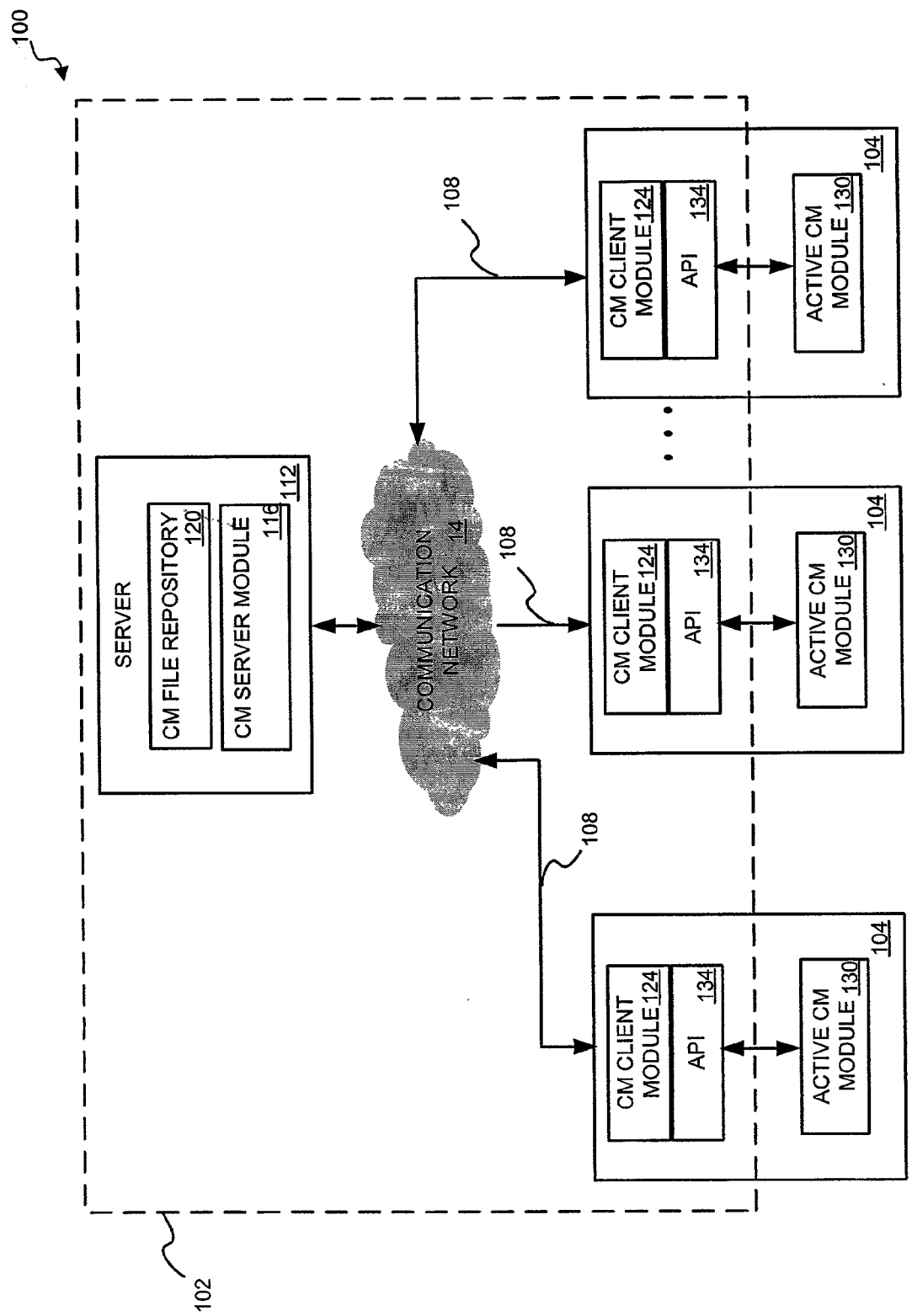
FIG. 1 is a block diagram of a distributed computing system in which the active configuration management system of the present invention may be implemented.

FIG. 1 is a block diagram of a distributed computing system 100 in which the active configuration management system of the present invention may be implemented. In the exemplary implementation of FIG. 1, the inventive active configuration management system is designed to complement and interface with a conventional configuration management system 102. The distributed computing system of FIG. 1 is arranged in a "client-server" configuration in which a plurality of client units 104 are in communication over a corresponding plurality of network connections 108 with a server unit 112 via a communication network 14 (e.g., a local area network (LAN) or the Internet). The client units 104 may, for example, be workstations, personal computers, minicomputers or other computing devices on which run application programs. The server unit 112 may contain specialized hardware devices and/or software programs capable of providing various services to the client units 104.

As shown, the server unit 112 of the convention CM system 102 includes a server-side configuation management (CM) module 116 and associated CM file repository 120. In the implementation of FIG. 1, the server-side CM module 116 interfaces with a client-side CM module 124 within each client unit 104. In this regard the server-side CM module 116 and client-side CM modules 124 collectively implement the conventional configuration management system 102 which may be realized using, for example, the CM Synergy configuration management system offered by [Telelogic North America, Inc.]. As is discussed below, the active configuration management system of the present invention is capable of interacting with any conventional configuration management system 102 through its associated application programming interface (API). It follows that the particular allocation of functionality among the server-side CM module 116 and the client-side CM modules 124 is immaterial with respect to the structure or operation of the active configuration management system of the present invention.

Referring again to FIG. 1, each client unit 104 includes an active configuration management (CM) module 130 disposed to effect active configuration management operations in accordance with the present invention. Each active CM module 130 interfaces through an API 134 with the associated client-side CM module 124 within the applicable client unit 104.

As mentioned previously, the functionality of the active CM system of the present invention supplements that of the conventional configuration management system 102 in a manner that results in elimination of many of the disadvantages of system 102. For example, the active CM system of the present invention effects automatic saving of changes made in a work area to the corresponding component of the CM file repository 120. That is, users will not need to invoke a conventional reconciliation operation or its equivalent in order to ensure that changes made in their respective work areas are mirrored within corresponding components in the CM file repository 120. Similarly, when a user renames or moves a file, the same change will automatically occur in the CM file repository without the user intervention which would be conventionally required.

The active CM system of present invention also facilitates making the file directories associated with users of the client units 104 "transparent" to other such users by causing directory information to be automatically saved within the CM file repository 120. That is, users of conventional configuration management systems must generally remember to "check-in" the directory associated with a new file upon check-in of such file to render the file visible to other system users. The inventive active CM system is disposed to learn, by monitoring the behavior of users of the client units 104, which types of files should be saved to the CM file repository 120 or otherwise be made subject to CM control. In this regard many software tools executable on the client units 104 create temporary files that the applicable user would not want saved or controlled. In an exemplary embodiment, the active CM system will learn to ignore such temporary files on the basis of the work habits of the users of the client units 104.

Figure 2:
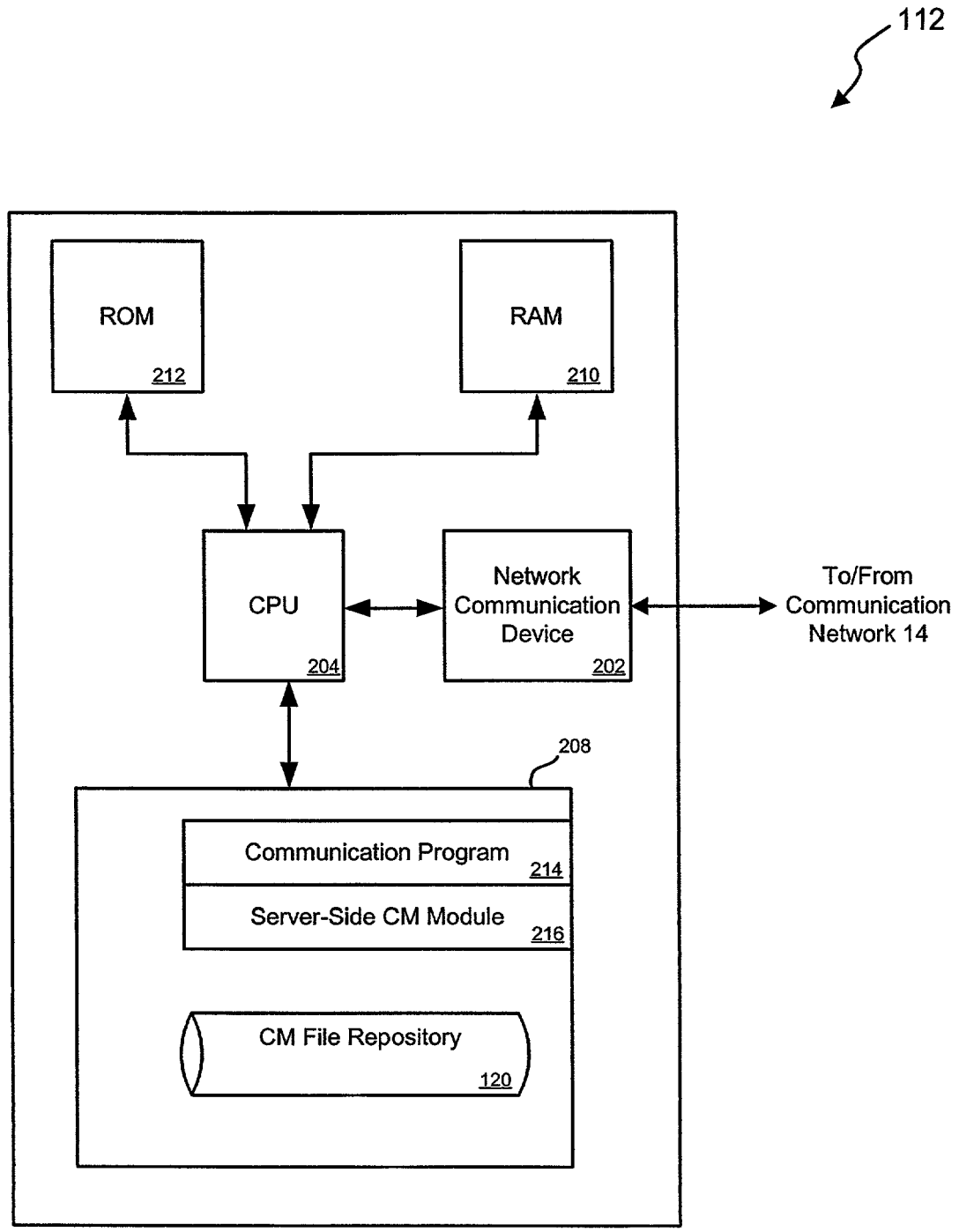
FIG. 2 provides a block diagram of an exemplary implementation of a server unit.

FIG. 2 provides a block diagram of an exemplary implementation of a server unit 112. As shown, the server unit 112 includes standard server computer components, including a network connection device 202, a CPU 204, secondary memory 208, RAM 210 and ROM 212. The memory 208 stores a copy of the operating system (not shown) for the server unit 112, and a standard communication program 214 to realize standard network communications via the network connections 108. The memory 208 also stores the server-side CM module 116, which is complementary to the client-side CM module 124 within each client unit 104. The memory further includes the CM file repository 120. Each of the server units 112 need not have this configuration, and this configuration is intended to be merely illustrative.

Figure 3:
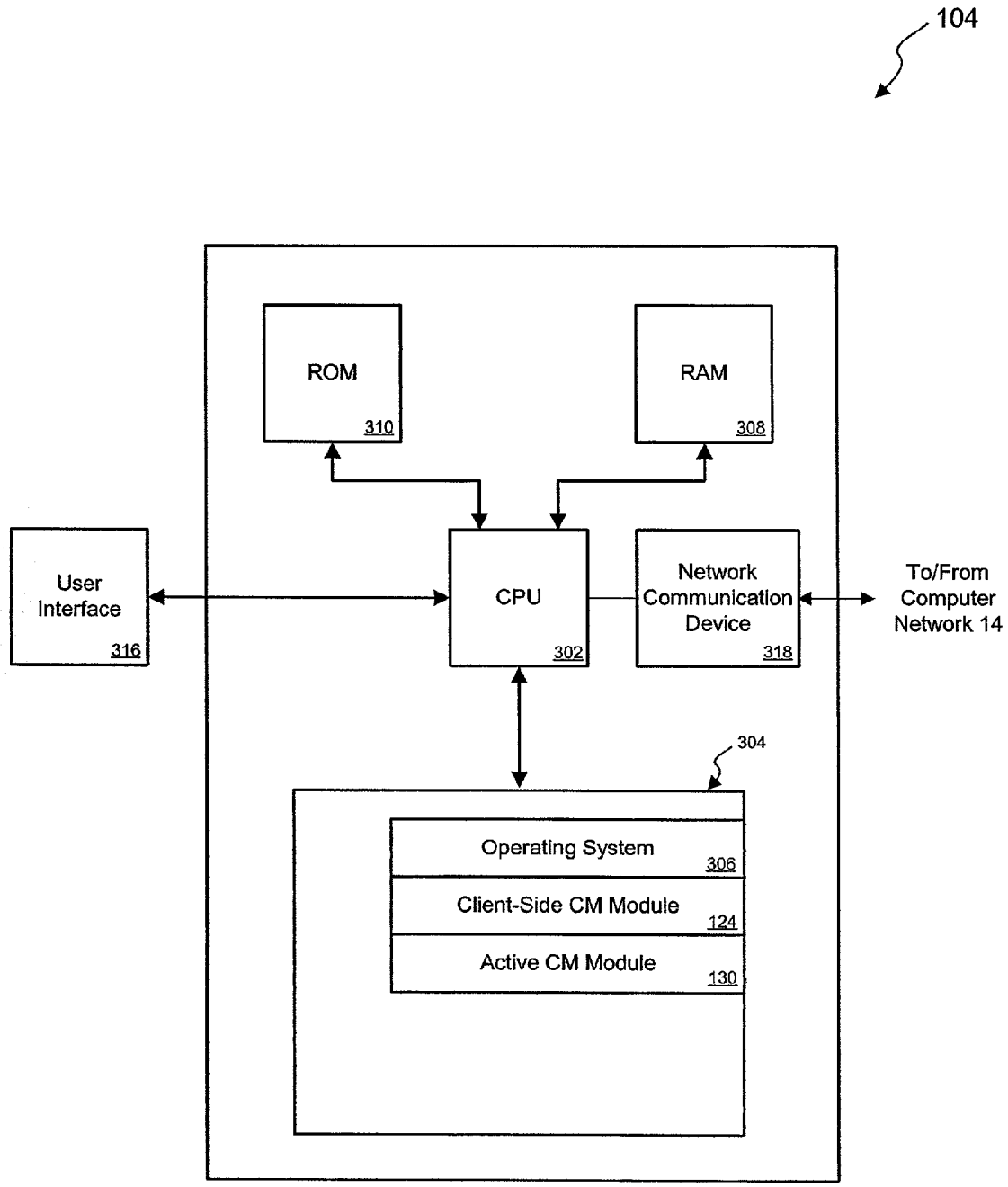
FIG. 3 depicts a particular implementation of a client unit in block diagram form.

Referring to FIG. 3, a particular implementation of one of the client units 104 is depicted in block diagram form. Although a particular client unit 104 may only have some of the units illustrated in FIG. 3 or may have additional components not shown, most client units will include at least the elements shown. Each client unit 104 preferably includes a central processing unit ("CPU") 302, a memory subsystem 304, RAM 308 and ROM 310. The memory subsystem 304 holds a copy of the operating system 306 for the client unit 104. The operating system 306 is capable of generating conventional event messages based upon file system activity. Also included within the memory subsystem 304 are the client-side CM module 124 and the active CM module 130, each of which executes on the CPU 302. The client unit 104 further includes a user interface 316 (e.g., a display, keyboard and/or mouse), and standard network communication device 318 for establishing a link with the applicable network connection 108. Each of the client units 104 need not have this configuration, and this configuration is intended to be merely illustrative.

Before a user of a client unit 104 begins interaction with any file components stored within the CM file repository 120, the operating system 306 loads both the client-side CM module 124 and the active CM module 130 into RAM 308. As is described hereinafter, the active CM module 130 of the present invention commands the client-side CM module 124 to perform various operations in response to user interaction with file components (e.g., user editing, renaming, and saving). During operation of the system 100, the client-side CM module 124 of a client unit 104 may initiate access one or more file-based components of the CM file repository 120 using by cooperating with server-side CM module 116 to initialize a project "work area" within RAM 308 through which file editing operations may be performed. The mechanisms and details associated with such initialization of a work area, and initial check-out or other retrieval of components from the CM file repository 120, are known to those skilled in the art and will not be described further herein. Once the work area has been opened, the user may edit or otherwise interact with the applicable file component via user interface 316 and associated application program (e.g., Microsoft Word) executing on the operating system 306. These editing operations and other user interactions with the work area are monitored by the active CM module 130, which communicates appropriate instructions to the client-side CM module 124 via API 134 in response to certain user operations (described below) affecting the composition or directory representation of file components represented within the CM file repository 120.

Figure 4:
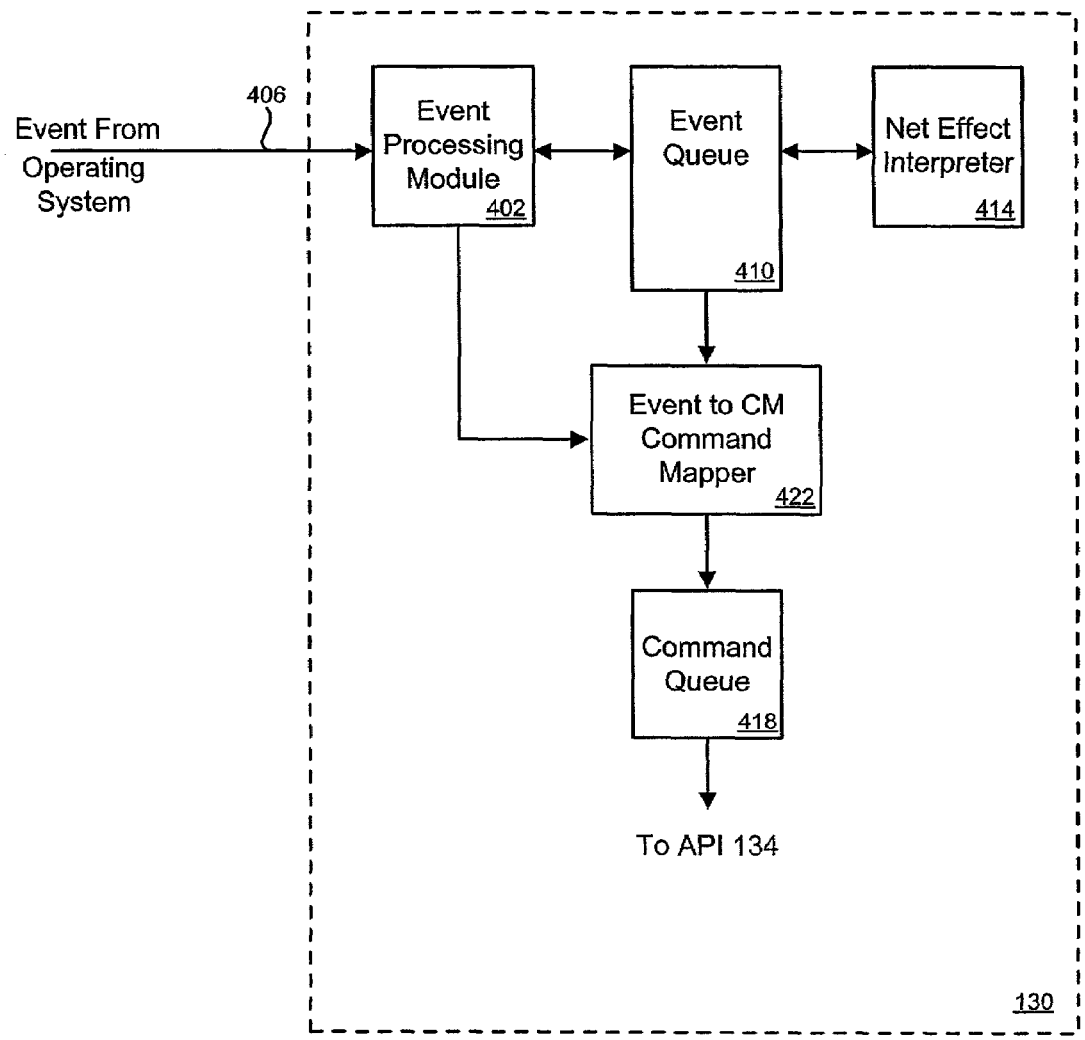
FIG. 4 provides a simplified block diagram representation of an exemplary implementation of an active CM module.

FIG. 4 provides a simplified block diagram representation of an exemplary implementation of an active CM module 130. As is described in further detail below, the active CM module 130 includes an event processing module 402 disposed to process events 406 received from the operating system 306 of the applicable client unit 104. Event objects corresponding to the received operating system events 406 are placed within an event queue 410 by the event processing module 402. A net effect interpreter 414 functions to combine certain related pairs of events event objects within the event queue 410 into a single event representative of the "net effect" of a given pair of event objects. For example, in the case where the event queue 410 retains both a "delete" event object for a given file component as well as a "create" event object for the same file, the net effect interpreter 414 would replace these event objects with a "modify" event object. Events which have been held in the event queue 410 for at least a predetermined time period are then mapped 422 into active CM commands disposed to invoke functionality of the conventional CM system 102 via the applicable API 134 by causing it to execute one or more CM operations.

Figure 5:
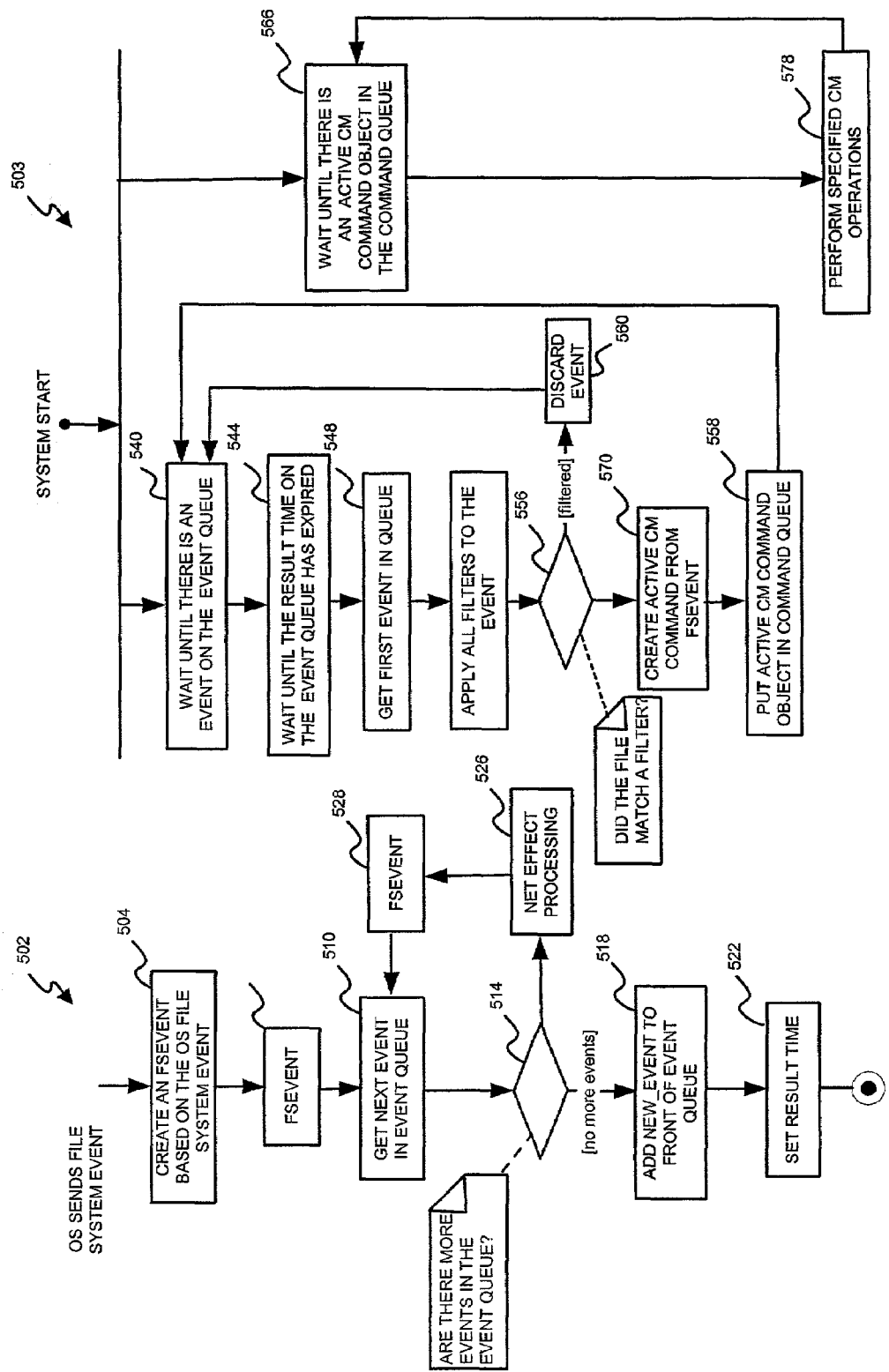
FIG. 5 is a flow chart illustratively depicting the operations associated with an event queue processing thread and a command queue processing thread.
Figure 6:
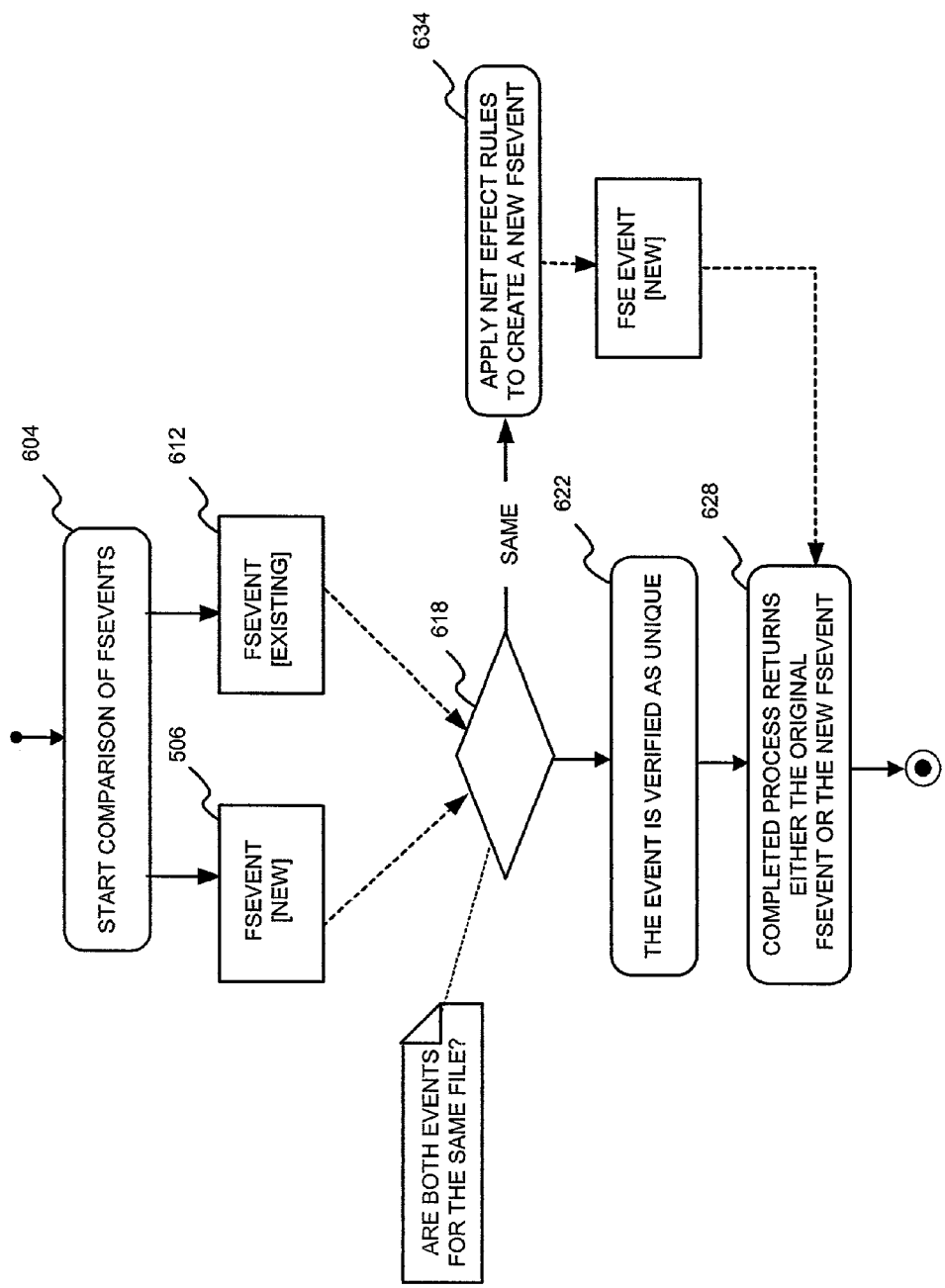
FIG. 6 is a flow chart representative of the net effect processing performed by a net effect interpreter module.

FIGS. 5 and 6 are flowcharts collectively representing the operation of the active CM module 130 in connection with the processing of file processing events received from the operating system 306 of the applicable client unit 104 and conversion of such events into CM operations executable by the conventional CM system 102. More specifically, the flowchart of FIG. 5 illustratively depicts the operations associated with an event queue processing thread 502 and a command queue processing thread 503.

In an initial operation (step 504) of the event queue processing thread 502, an input FSEvent object 506 is created by the event processing module 402 in response to such a file processing event received from the operating system 306. If an FSEvent is present within the event queue 410, the queued FSEvent is then retrieved (step 510) and provided to the net effect interpreter 414 along with the input FSEvent object 506. Within the net effect interpreter 414, then net effect processing (step 526) is carried out using the input FSEvent object 506 and the retrieved FSEvent object (described below with reference to FIG. 6). Such net effect processing 526 is performed with respect to the input FSEvent object until either: (1) the input FSEvent object 506 is combined with an FSEvent object retrieved from the event queue 410 in order to yield a new FSEvent object, or (2) net effect processing has been carried out between the input FSEvent object 506 and each FSEvent object within the event queue 410 and no unexamined FSEvent objects remain within the event queue 410 (step 514). The new FSEvent object 528 created during such net effect processing (i.e., which comprises either the original input FSEvent object 506 or a combined FSEvent object based upon the input FSEvent object 506 and another FSEvent object previously within the event queue 410) is then placed in the last position of the event queue 410 (step 518) and appropriately time-stamped (step 522). In the case where the new FSEvent object 528 comprises a combination of the input FSEvent object 506 and another FSEvent object within the event queue 410, both of these FSEvent objects are deleted from the event queue 410 upon insertion therein of the new FSEvent object 528. The steps 504-522 of processing thread 502 are repeated for each file system event received from the operating system 306.

FIG. 6 is a flow chart representative of the net effect processing performed by the net effect interpreter 414. As shown in FIG. 6, net effect processing is initiated (step 604) by retrieving both a given input FSEvent object 506 and an FSEvent object 612 previously stored within the event queue 410. It is then determined whether the input FSEvent object 506 and the existing FSEvent object 612 relate to the same file (step 618). If not, the input FSEvent object 506 is verified as being unique (step 622) and is returned as the new FSEvent object 528 (FIG. 5) in a step 628. If the input FSEvent object 506 and the existing FSEvent object 612 do relate to the same file, a combined FSEvent is created on the basis of predefined net effect rules (step 634) and returned as the new FSEvent object 528. As is described below, Table XXXVII contains a set of exemplary net effect rules pursuant to which a pair of FSEvent objects relating to the same file are converted into a single new FSEvent object. In the exemplary embodiment described above, it may be appreciated that net effect processing is only conducted to the extent that multiple file system events relating to the same file are produced by the operating system 306 within a fixed period of time (i.e., the result time).

Turning again to FIG. 5, in the exemplary embodiment the command queue thread 503 executes continuously and substantially constantly monitors the event queue 410. That is, the event queue 410 is monitored in order to determine when at least one FSEvent object is stored therein (step 540). Upon detecting that the result time of an FSEvent object within the event queue 410 has expired (step 544), then such FSEvent object is retrieved from the event queue 410 (step 548) and no further net effects processing is done with respect to the retrieved FSEvent object. In the exemplary embodiment, a set of filters in the form of regular expressions is applied to the FSEvent object retrieved from the event queue 410 (step 552). If the retrieved FSEvent object does not match one of the applied filters (step 556), it will be mapped to an active CM command object 418 in the manner described below (step 570); otherwise, the retrieved FSEvent object is discarded (step 560). In general, the filters applied to the retrieved FSEvent object are constructed so as to identify only those FSEvent objects not of interest to the conventional CM system 102. For example, many development tools and other application programs installed on client units 104 may create a number of temporary files during execution. These files are often not of interest from the perspective of the CM system 102 or to users of the client units 104, since they are generally only created, accessed and used exclusively by the application program or tool responsible for their creation. Accordingly, filters may be constructed to preclude such temporary and similarly uninteresting files from being processed by the CM system 102.

As shown in FIG. 5, the command queue thread 503 continuously monitors the command queue 418 and waits until an active CM command object is inserted therein (step 566). Once this occurs, one or more instructions corresponding to the active CM command object are passed to the CM system 102 via the API, thereby causing the CM system 102 to perform a sequence of one or more operations of the type described below with reference to FIGS. 11-13 (step 578).

Figure 7:
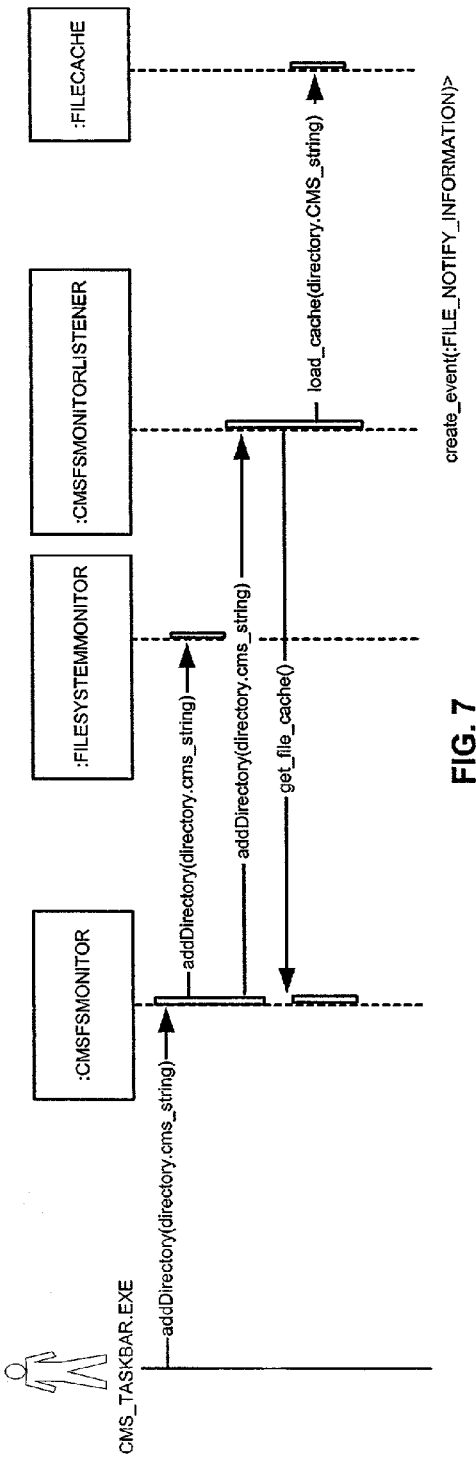
FIG. 7 is an event trace diagram illustrating the process of adding a file system directory to be monitored in accordance with the active CM system of the invention.

FIGS. 7-10 are event trace diagrams representative of certain aspect of the operation of an exemplary object-oriented implementation of the inventive active CM system. In the event trace diagrams of FIGS. 7-10, reference will be made to the object instantiations of various classes described in further detail below as well as to certain methods associated therewith. For example, the event trace diagram of FIG. 7 depicts representations of instantiations of the classes "CMFSMonitor", "FileSystemMonitor", "CMSFSMonitorListener" and "FileCache", each of which is described in further detail with reference to one or more of the class diagrams discussed below. In FIGS. 7-10 the vertical lines are labeled at the top to correspond with different components or objects within the active configuration management system of the invnetion. Messages are passed between components or objects to effect the processes described below. In general, time flows from top to bottom in FIGS. 7-10.

FIG. 7 is an event trace diagram illustrating the process of adding a file system directory to be monitored in accordance with the active CM system of the invention. It will be appreciated that prior to operation of the system, various system initialization procedures will be effected by a top-level control program hereinafter referred to as "cms_taskbar.exe". In the exemplary embodiment these initialization operations performed by cms_taskbar.exe include the following:

create a CommandQueue
creates an empty FileCache
creates a FSMonitor
creates a CMSFSMonitorListener
adds the CMSFSMonitorListener to the FSMonitor
creates a Filter
adds the Filter to the CMSFSMonitorListener Following this system initialization process, directories to be monitored by the inventive active CM system are identified in the manner depicted by the event trace diagram of FIG. 7. Specifically, cms_taskbar.exe adds the directories to be monitored to CMSFSMonitor using a CMSFSMonitor.add_directory( ) method. CMSFSMonitor.add_directory( ) passes directory path to its FSMonitor.addDirectory( ) method. Next, FSMonitor.addDirectory informs the operating system 306 of the applicable client unit 104 to begin monitoring events on the passed directory hierarchy. CMSFSMonitor.add_directory( ) also passes the directory path onto its CMSFSMonitorListener.add_directory( ) method, and CMSFSMonitorListener.add_directory( ) gets the FileCache and calls FileCache.load_cache. FileCache.load_cache will then add all of the files and directories in the specified path to the FileCache.

Figure 8:
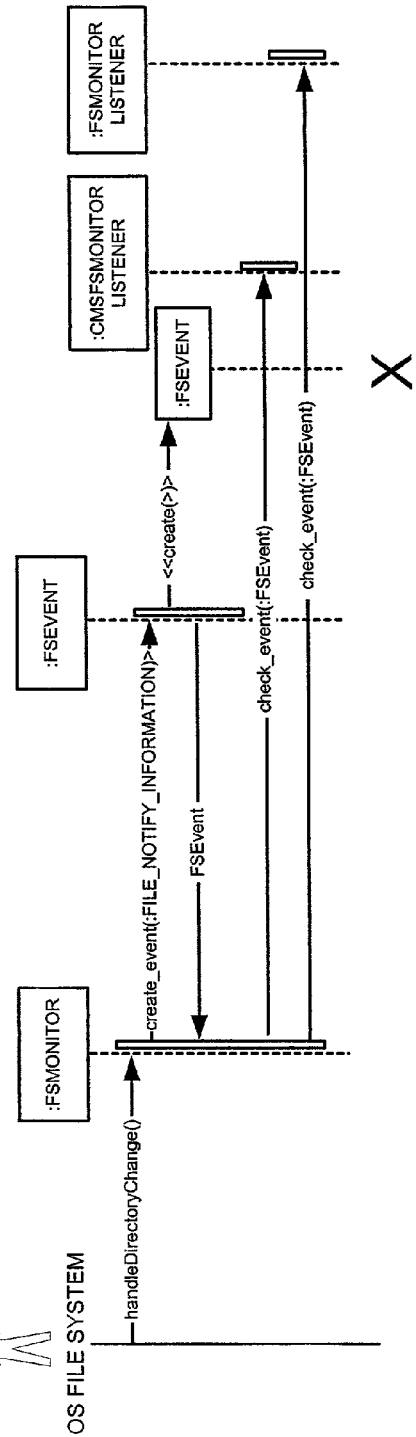
FIGS. 8 and 9 are event trace diagrams representative of an exemplary manner in which the active CM system monitors the events generated by the operating system of the applicable client unit and responds to such events.
Figure 9:
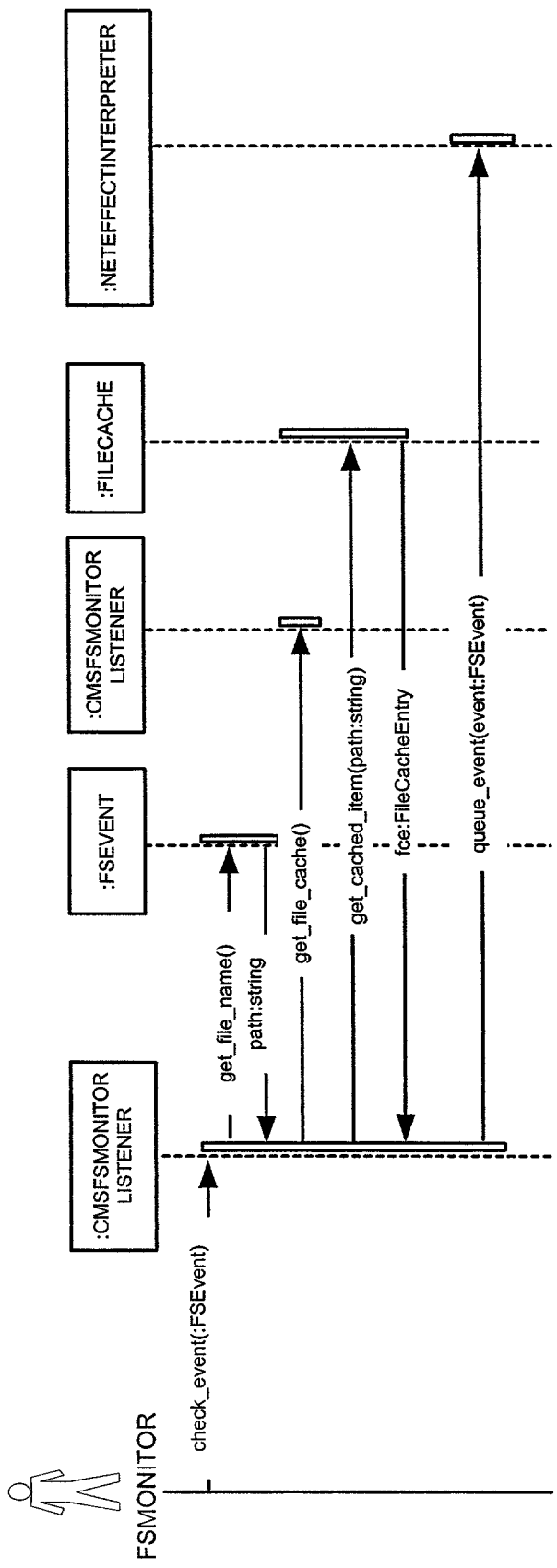

FIGS. 8 and 9 are event trace diagrams representative of an exemplary manner in which the active CM system monitors the events generated by the operating system 306 of the applicable client unit 104 and responds to such events. As shown, the operating system 306 sends a generated event to FSMonitor. In response, FSMonitor creates an FSEvent based upon the event received from the operating system 306. For each FSMonitorListener stored within FSMonitor, the FSMonitor.check_event(:FSEvent) is then called.

Figure 10:
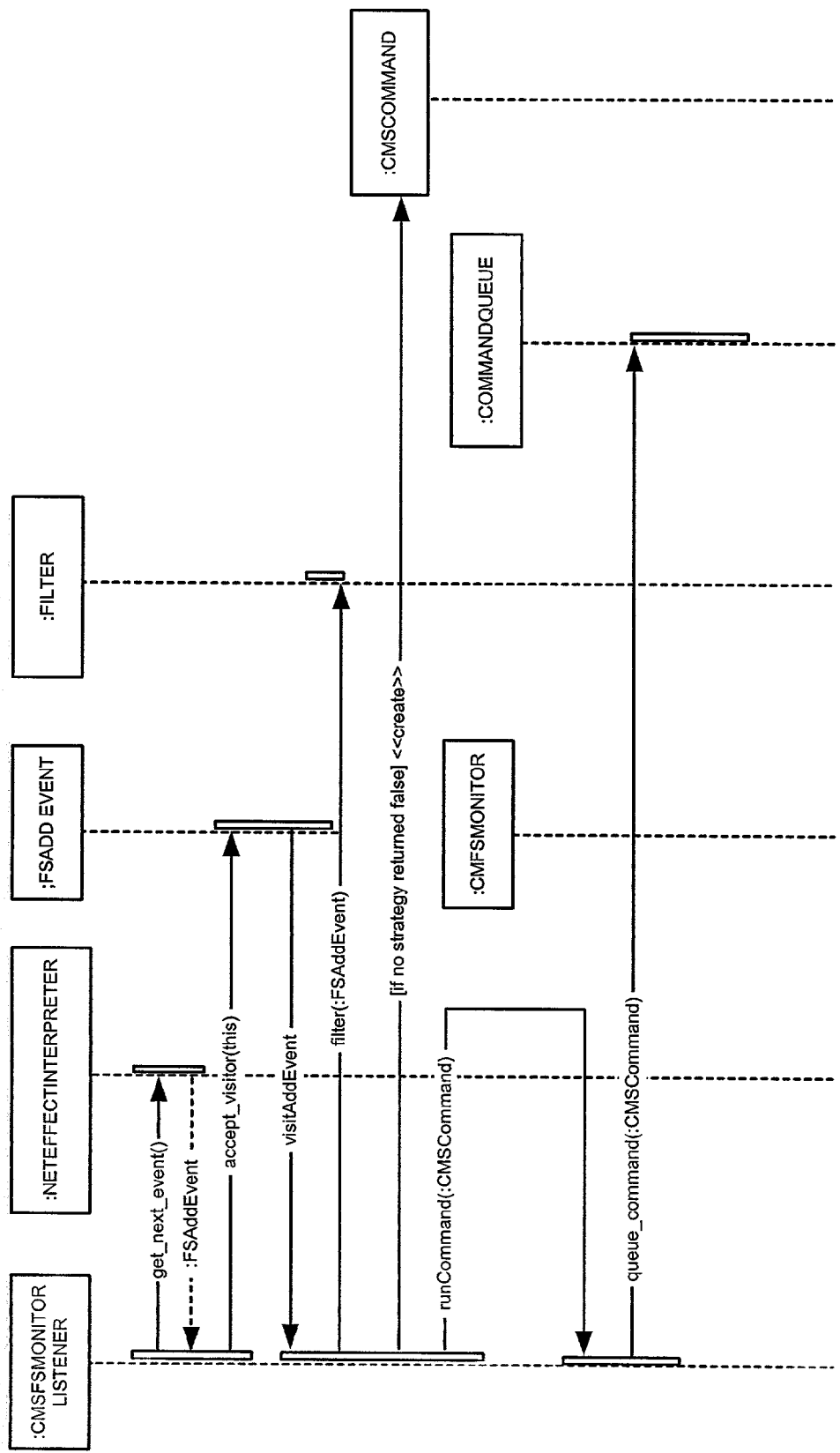
FIG. 10 is an event trace diagram representative of the operation of various instantiated class entities in executing the command queue thread.

FIG. 10 is an event trace diagram representative of the operation of various instantiated class entities in executing the command queue thread 503 in the manner described above with reference to FIG. 5. That is, FIG. 5 illustrates operations associated with the functions of extracting an event from the event queue 410, transforming the extracted event into an active CM command, and placing the resultant active CM command in the command queue 418. Although the event trace diagram of FIG. 10 is directed specifically to the transformation of an FSAddEvent into a corresponding CMSCommand executable by the CM system 102, a substantially identical procedure would be employed to transform other operating system events into corresponding active CM commands. As shown, the command queue thread 503 acquires those FSEvents placed in the event queue 410 and applies a set of filters to the acquired event. If the event is for a filename that matches one of the applied filters, then the event is dropped and no further operations are performed. Otherwise, the event is mapped to a CMSCommand placed in the command queue 418.

As was described above with reference to FIGS. 5 and 10, certain FSEvents removed from the event queue 410 are mapped to appropriate active CM commands, each of which is disposed to invoke functionality of the CM system 102 by causing it to perform various conventional CM operations (e.g., file "check out" and "check in" operations). In an exemplary implementation of the active CM system, the actual mapping of FSEevents to active CM commands is performed using an appropriate visit method (described below) in CMS-FSMonitorListener. Table I sets forth an exemplary set of mappings between FSEvents and corresponding active CM commands. As is described hereinafter, each active CM command is configured to invoke particular functionality of the CM system 102 by specifying certain operations to be performed by the CM system 102 via the API 134 of the applicable client unit 104. Although the exemplary set of mappings between various FSEvent objects and corresponding active CM commands set forth below in Table I have been developed with a view toward invoking functionality of the above-referenced CM Synergy configuration management system, it may be appreciated that analogous mappings may be utilized in alternate implementations in order to invoke the functionality of other commercially available configuration management systems.

TABLE I

| FSEvent | CMSFSMonitorListener method | Active CM Command |
| --- | --- | --- |
| FSModifyEvent | visitModifyEvent( ) | tsync |
| FSRemoveEvent | visitRemoveEvent( ) | tremove |
| FSAddEvent | visitAddEvent( ) | tsync |
| FSRenameEvent | visitRenameEvent( ) | trename |
| FSSynchronizeEvent | visitSynchronizeEvent( ) | tsync |

Figure 11:
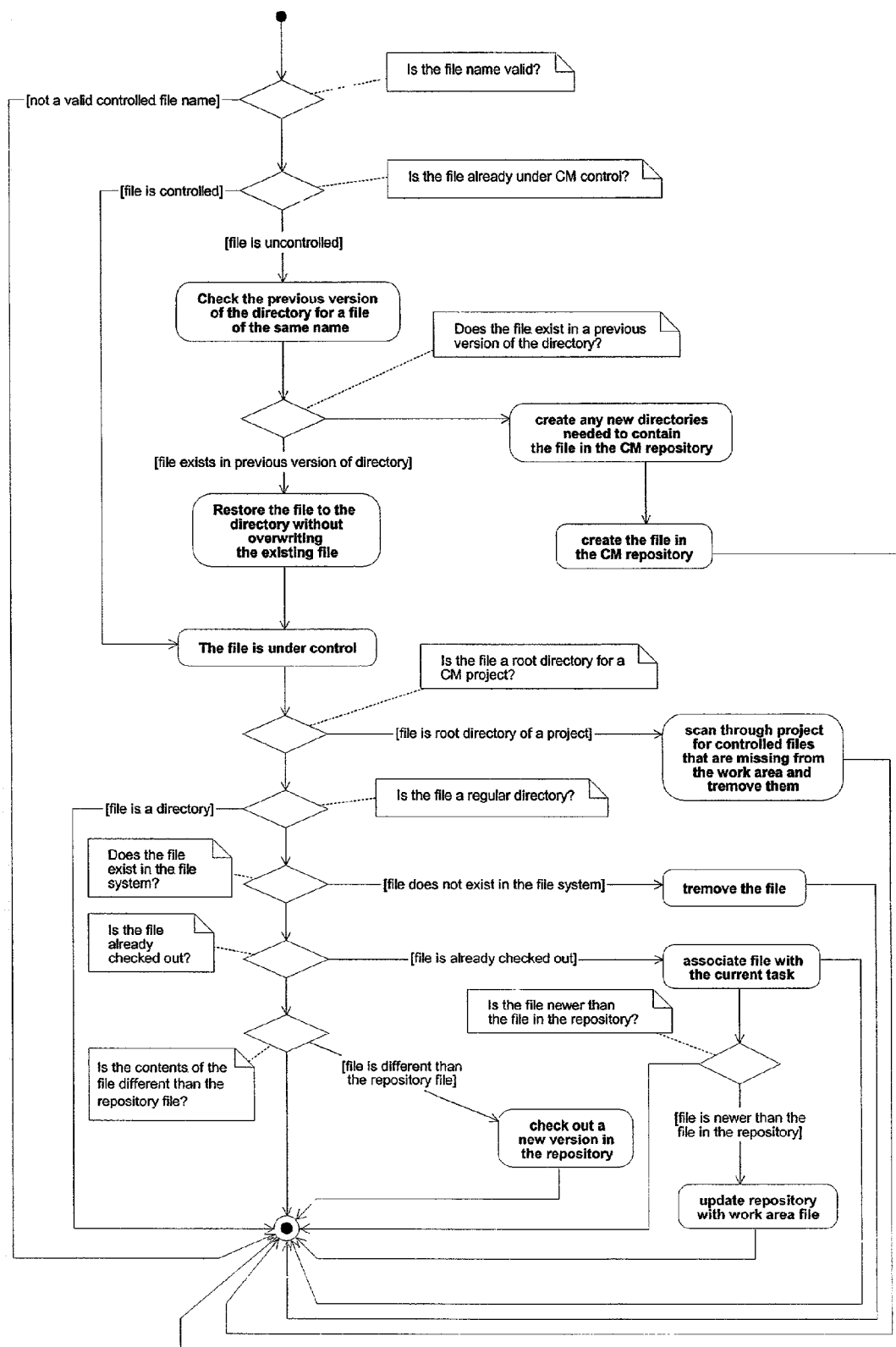
FIG. 11 is an activity diagram representative of the processing carried out by a conventional CM system in response to a transparent synchronization CM command created on the basis of an FSEvent of type FSSynchronizeEvent.
Figure 12:
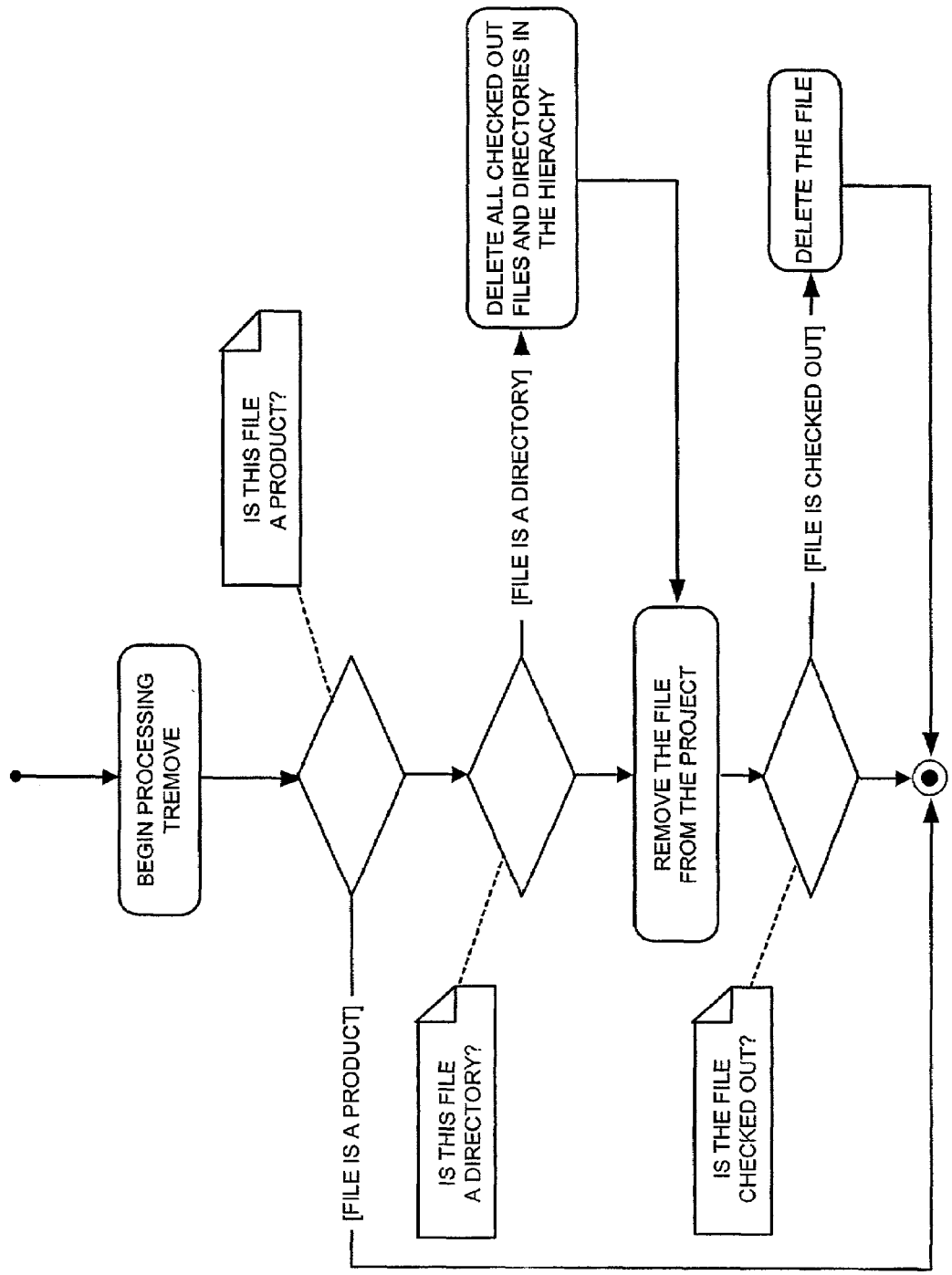
FIG. 12 is an activity diagram representative of the processing carried out by the conventional CM system in response to a transparent remove CM command created on the basis of an FSEvent of type FSRemoveEvent.
Figure 13:
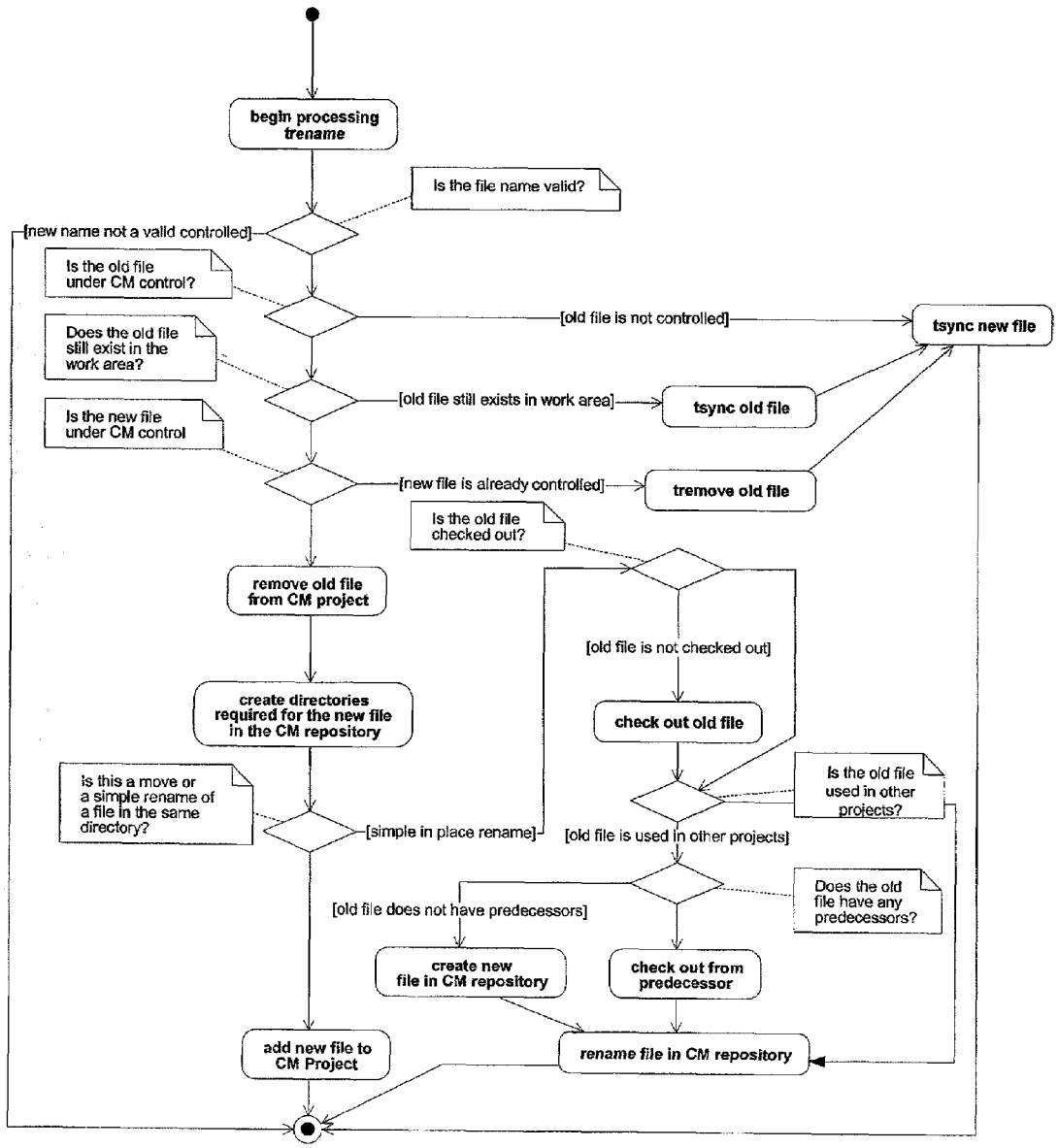
FIG. 13 is an activity diagram representative of the processing carried out by the conventional CM system in response to a transparent rename CM command created on the basis of an FSEvent of type FSRenameEvent.

FIGS. 11-13 are activity diagrams representative of the processing effected within the CM system 102 in response to various active CM commands identified in Table I. Turning to FIG. 11, an activity diagram is depicted which is representative of the processing carried out by the CM system 102 in response to a transparent synchronization ("tsync") active CM command created on the basis of an FSEvent of type FSSynchronizeEvent. The processing operations represented by the activity diagram of FIG. 11 may be more fully appreciated by referring to the exemplary pseudocode for the tsync operation set forth below:

```
tsync
    If file name is not a valid controlled file name, done
    If file is uncontrolled and it still exists
        Check previous version of the directory for a file of the same
        name
```

-continued

```
        If such a file exists
            It is restored to the directory without overwriting the
            existing file
            Go to controlled file code
        else
            Create any directories required for the file in the database
            Controlled object is created
            Done
    If file is controlled
        If file is root directory of a project
            Scan through project looking for controlled files which are
            missing from the work area and tremove them
            Done
        If work area file does not exist, tremove it, done
        If file is a directory, done
        If controlled file is checked out
            Associate file with current task
            Update database if content of work area was created more
            recently
            Done
        If work area file is different from database file
            Check out a new version
            Done
```

FIG. 12 is an activity diagram representative of the processing carried out by the CM system 102 in response to a transparent remove ("tremove") CM command created on the basis of an FSEvent of type FSRemoveEvent. The processing operations represented by the activity diagram of FIG. 12 may be more fully appreciated by referring to the exemplary pseudocode for the tremove operation set forth below:

```
tremove
If file is a product, done
If file is a directory
            For all children of the directory including sub-
            directories
            If file is checked out, delete it
    Unuse file
    If file is checked out, delete it
```

Referring now to FIG. 13, an activity diagram is provided that is representative of the processing carried out by the CM system 102 in response to a transparent rename ("trename") CM command created on the basis of an FSEvent of type FSRenameEvent. The processing operations represented by the activity diagram of FIG. 12 may be more fully appreciated by referring to the exemplary pseudocode for the trename operation set forth below:

```
trename
    If new name not a valid controlled file name, tsync old file
    name, done
    If old file is not controlled, tsync new file, done
    If old file still exists in work area
        tsync old file
        tsync new file
        done
    If new file is already controlled
        tremove old file
        tsync new file
        done
    unuse old file
    create any directories required for the new file in the database
    If renaming
        If old file is not checked out, check it out
        If old file is bound in other projects
```

-continued

> If old file does not have predecessors, create a new file
> else check out from a predecessor
> Rename database object
> use new file FIGS. 14-22 depict a set of class diagrams representative of an exemplary object-oriented implementation of the active CM system of the present invention. The class diagrams of FIGS. 14-22 have been rendered in accordance with the *Unified Modeling Language Specification* published by, among others, the Object Management Group Inc.

Figure 14:
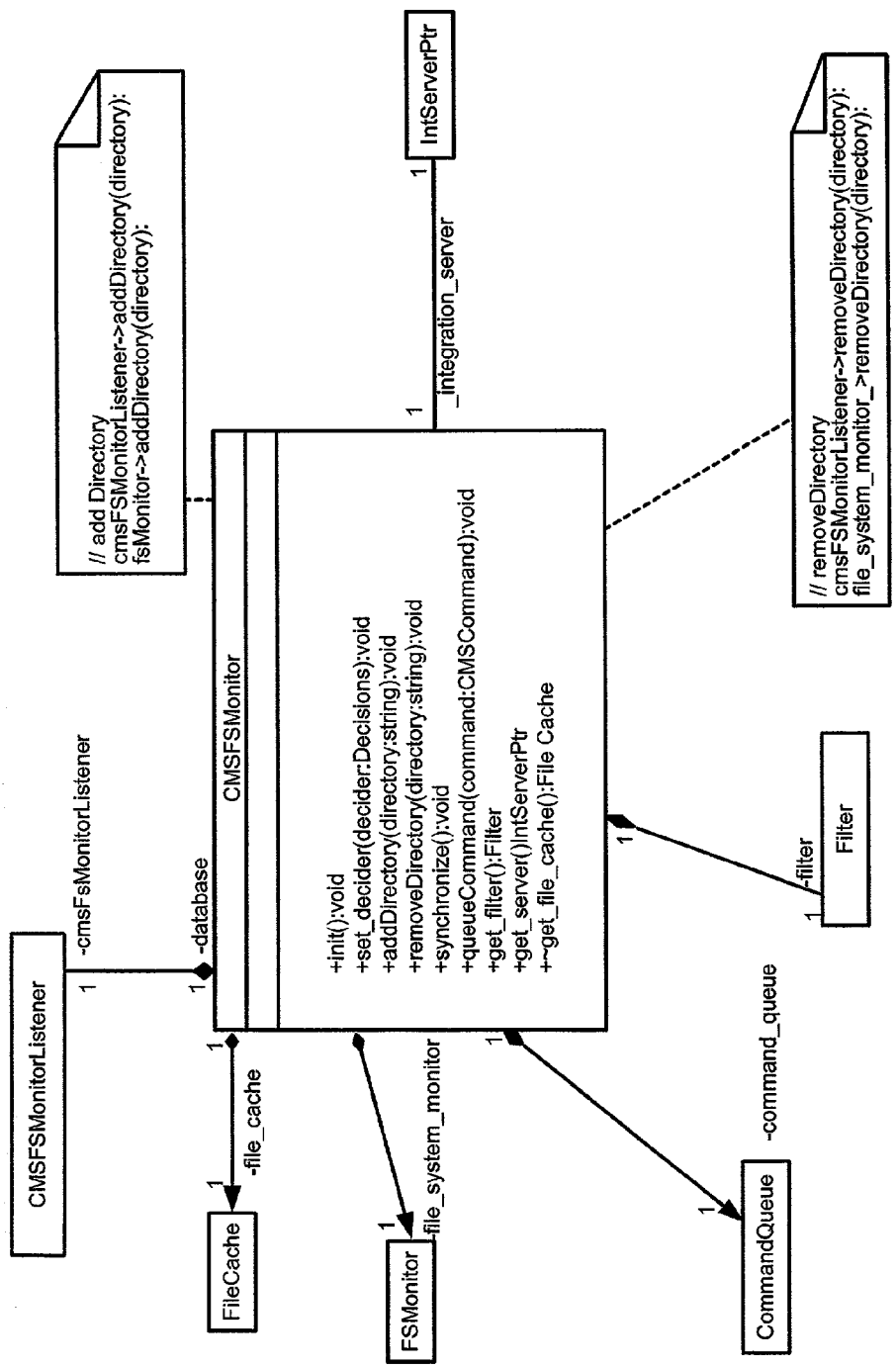
FIG. 14 depicts a class diagram representative of a CM Synergy File System Monitor (CMSFSMonitor) class.

Turning now to FIG. 14, a class diagram is provided for a CM Synergy File System Monitor (CMSFSMonitor) class. Instantiations of the CMSFSMonitor class function to (1) provide interfaces enabling interaction between the active CM system of the present invention and other software executed by the applicable client unit 104, (2) control other classes of the active CM system that interact with native file systems, and (3) marshal interactions with the CM system 102. As may be apparent from the other class diagrams described below, many of the methods in CMSFSMonitor serve as wrappers for methods associated with the CMFSMonitorListener and FSMonitor classes. Table II and Table III respectively describe the functions of a constructor and various methods associated with the CMSFSMonitor class.

TABLE II

| CONSTRUCTOR | DESCRIPTION |
| --- | --- |
| CMSFSMonitor( ) | Starts the active CM session<br>Creates an empty FileCache<br>Creates a CMSFSMonitorListener<br>Creates a Filter<br>Creates a FSMonitor<br>Creates a CommandQueue |

TABLE III

| METHODS | DESCRIPTION |
| --- | --- |
| addDirectory(directory:string):void | Add directory to the set of directories being monitored. This is a wrapper method that passes directory to CMSFSMonitor. addDirector( ) and FSMonitor. addDirectory( ). |
| removeDirectory(directory: string):void | Remove directory from the set of directories being monitored. This is a wrapper method that passes a directory to CMSFSMonitor. addDirectory( ) and FSMonitor. addDirectory( ). |
| synchronize( ):void | Force all files in monitored directories to be synchronized with the CM system. |
| queue_command(command:string):void | Queue a command for processing. This method is used by calling applications to place commands in the command queue 418 to be processed along with commands being generated by the CMSFSMonitorListener |
| get_filter( ):Filter | Get a reference to the file name filter object. |
| get_server( ):IsessionPtr | Get a reference to the underlying CM API COM object. |

Figure 15:
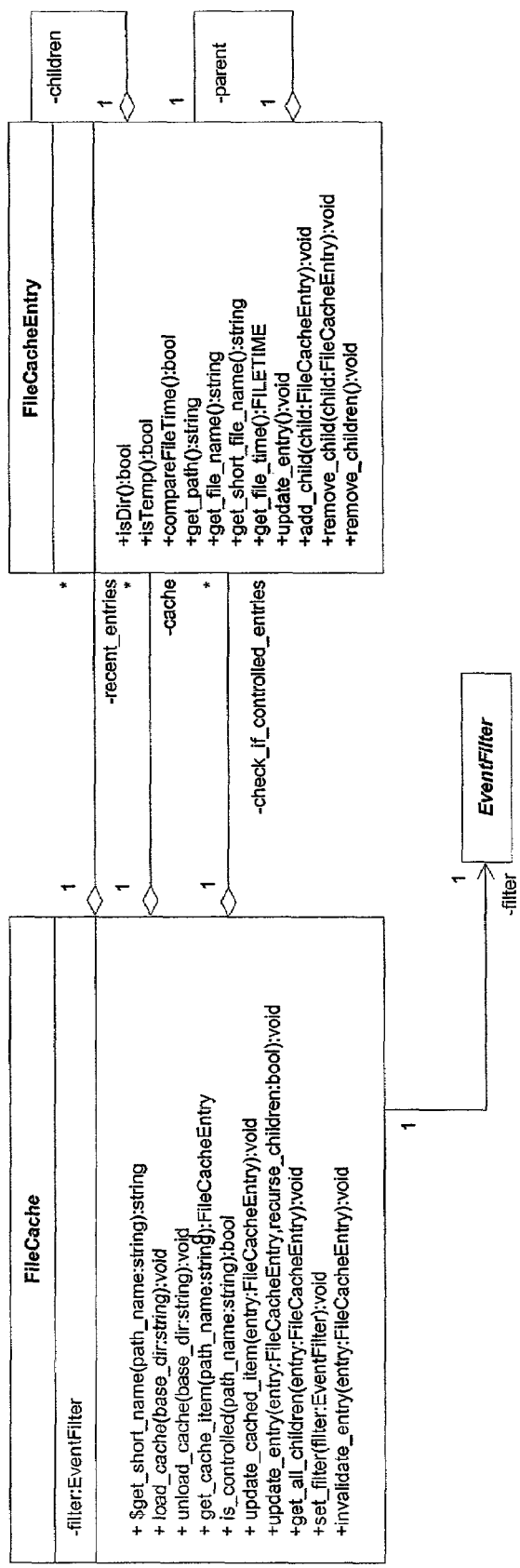
FIG. 15 a class diagram representative of a FileCache class and a FileCacheEntry class.

FIG. 15 a class diagram representative of the composition of the FileCache class. Instantiations of the FileCache class function to maintain the current state of all files being monitored. This enables determination of whether a given file is currently under control of the CM system 102 and permits storage of key attributes of such files. In the exemplary embodiment each instantiation of the FileCache class is comprised of a collection of FileCacheEntries. Table IV and Table V respectively describe the functions of a constructor and various methods associated with the FileCache class.

TABLE IV

| CONSTRUCTOR | DESCRIPTION |
| --- | --- |
| FileCache( ) | Constructs an empty FileCache |

TABLE V

| METHODS | DESCRIPTION |
| --- | --- |
| load_cache(base_dir: string):void | Load the contents of base_dir and its subdirectories into the cache |
| Unload_cache(base_dir: string):void | Remove the contents of this directory and its subdirectories from the cache. |
| get_cache_item(path_name: string): FileCacheEntry | Look up the FileCacheEntry for path_name in the cache. Returns NULL if entry is not found. |
| is_controlled(path_name: string):bool | Returns true of path_name is under control of CM system 102. |
| update_cached_item(path_name: string): FileCacheEntry | Update the cached information for path_name |
| remove_cache_item(entry:FileCacheEntry):void | Remove entry from the cache. |
| update_entry(entry FileCacheEntry, recurse_children:bool):void | Update the cache's date for the passed entry. If entry is a directory, and recurse_children is true, then update the contents of the directory as well. |
| get_all_children(entry:FileCacheEntry):EntryCollection | Get FileCacheEntrys' for all of the files contained within a directory. |
| set_filter(filter:EventFilter):void | Set the filename filter which will be used to determine if controlled files need to be cached. |
| invalidate_entry(entry:FileCacheEntry):void | Mark the entry's timestamp so that the item does not appear to be current. |

FIG. 15 also provides a class diagram representative of the structure of the FileCacheEntry class. Instantiations of the FileCacheEntry class represent either a file or a directory that is controlled by the CM system 102. Table VI and Table VII respectively describe the functions of a constructor and various methods associated with the FileCacheEntry class.

TABLE VI

| CONSTRUCTOR | DESCRIPTION |
| --- | --- |
| FileCacheEntry(file_name:string, file_time:FILETIME, attributes:DWORD, parent:FileCacheEntry) | Constructs a FileCacheEntry for the passed file_name with the passed attributes and the passed parent. |

TABLE VII

| METHODS | DESCRIPTION |
| --- | --- |
| isDir( ):bool | Return true if the entry is a directory. |
| isTemp( ):bool | Return true if the entry is a temporary file. |
| isHidden( ):bool | Return true if the entry is a hidden or system file. |

TABLE VII-continued

| METHODS | DESCRIPTION |
| --- | --- |
| compare_file( ):bool | Return true if cached values matches the file's current state. |
| get_path( ):string | Return the full path name of this entry. |
| get_file_name( ):string | Return this entry's name. |
| get_short_file_name( ):string | Return this entry's short file name. |
| has_short_name( ):bool | Return true if short name different from long name. |
| get_file_time( ):FILETIME | Return the last modification timestamp. |
| add_child(child:FileCache-Entry):void | Adds the child to this directory entry. |
| remove_child(child:FileCache-Entry):void | Removes the child from this directory entry. |
| remove_children( ):void | Remove all children from this directory entry recursively. |

Figure 16:
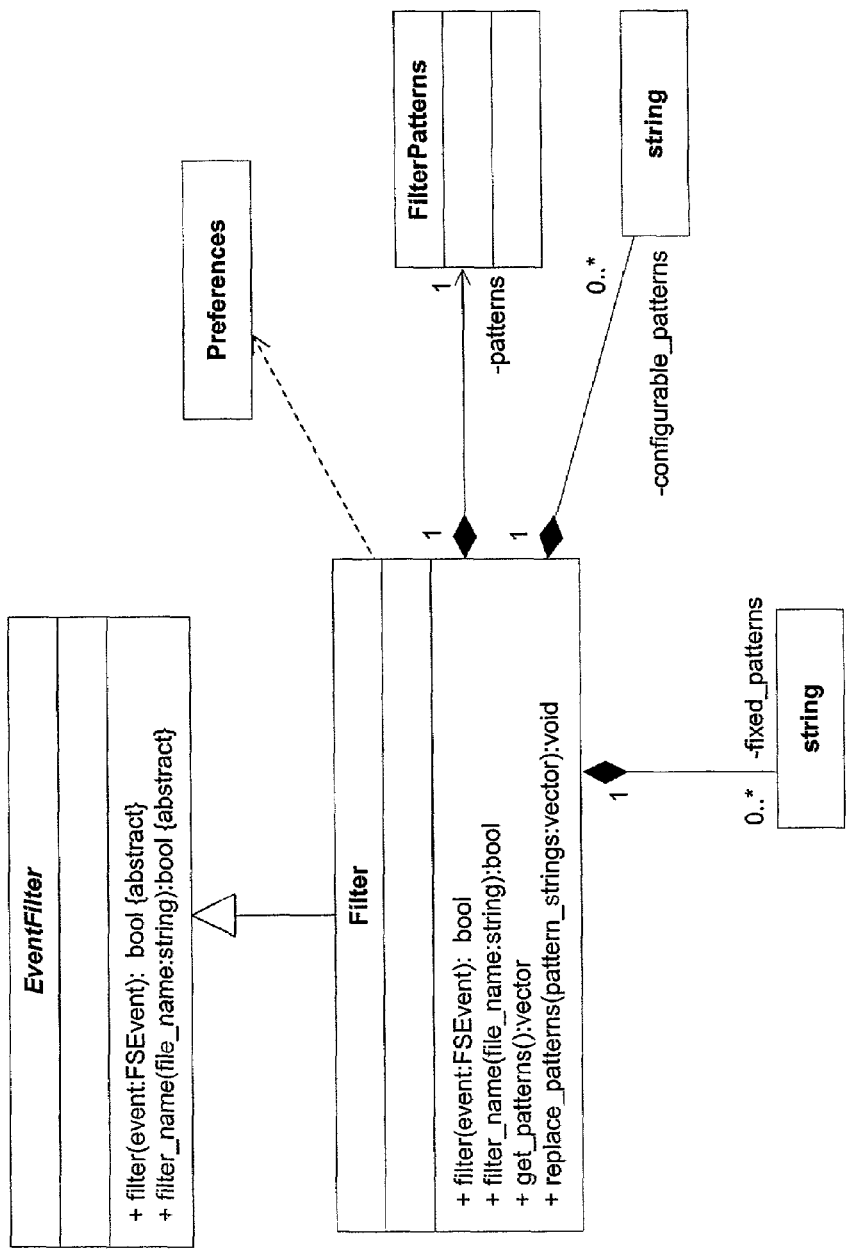
FIG. 16 a class diagram representative of a Filter class.

FIG. 16 a class diagram representative of the composition of the Filter class. Instantiations of the Filter class function to manage a set of lists of regular expressions which are used to check for matches against a given file or directory name. In the exemplary embodiment each instantiation of the Filter class comprises a concrete implementation of a EventFilter abstract class (described below). Table VIII describes the function of various methods associated with the Filter class.

TABLE VIII

| METHODS | DESCRIPTION |
| --- | --- |
| filter(event:FSEvent):bool | Extract the file name from FSEvent and check for a match against the set of filters. Returns true of the file name matches one of the regular expressions |
| filter_name(file_name:string):bool | Check the passed file_name against the set of regular expressions Returns true if the passed file_name matches one of the regular expressions |
| get_patterns( ): vector | Returns a vector containing all of the patterns as strings. |
| get_default_patterns( ): vector | Returns a vector containing the system default patterns as strings |
| replace_patterns(pattern_strings:vector):void | Replace the current set of patterns with the patterns in the passed pattern_strings vector. |
| save_patterns(system_preferences:bool): void | Writes the patterns to the database. When system_preferences is false, the files are saved for the current user. When true, the default patterns for the whole database are saved. |

The abstract EventFilter class functions to define an interface through which events from the operating system 306 of the applicable client unit 104 may be filtered. Table IX describes the function of various methods associated with the abstract EventFilter class.

TABLE IX

| METHODS | DESCRIPTION |
| --- | --- |
| filter(event:FSEvent):bool {abstract} | Filter based on an FSEvent. |
| filter_name(file_name:string):bool {abstract} | Filter based on a file name. |

Figure 17:
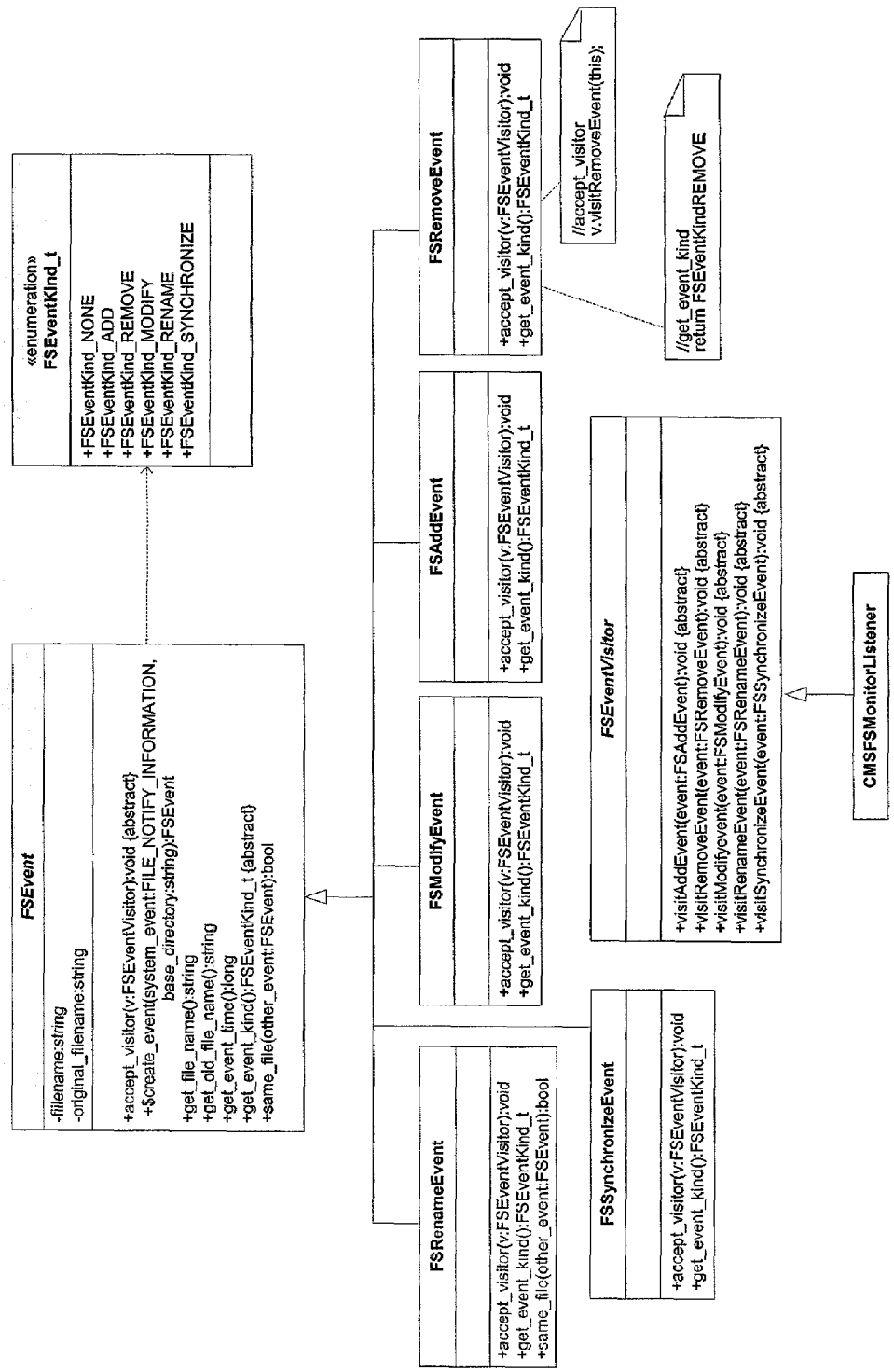
FIG. 17 is a class diagram representative of an abstract File System Event ("FSEvent") class.

FIG. 17 a class diagram representative of the composition of the abstract File System Event ("FSEvent") class. FSEvents are representations of file system events received from the operating system 306 of the applicable client unit 104. As such, each FSEvent contain attributes such as, for example, the name of the file with which the event is associated and the time of occurrence of the event. In the case of a file "rename" operation, the old and new names for the applicable file comprise attributes of the FSEvent. A different subclass of FSEvent is associated with each distinct type of file system event received from the operating system 306.

It is observed that in the exemplary embodiment, "rename" events as well as events created based upon the above-described "net effects" of multiple events may be associated with two distinct files. In this regard the "original_file attribute" corresponds to the name of the file before such an event occurs, and also is the name that is known in the FileCache. The "filename" attribute corresponds to the name of the file after such an event has been processed. Irrespective of the manner in which a particular FSEvent is created, the "filename" and the "original_filename" attributes are saved as part of the state of the FSEvent. If the two files corresponding to "filename" and "original_filename" have the same name, then no renaming of the latter file is deemed to have occurred as a result of the event.

Table X and Table XI respectively describe the functions of a constructor and various methods associated with the abstract FSEvent class.

TABLE X

| CONSTRUCTOR | DESCRIPTION |
| --- | --- |
| FSEvent(filename:string, original_filename:string) FSEvent(filename:string) | Constructs an FSEvent with the given filename and original_filename. |

TABLE XI

| METHODS | DESCRIPTION |
| --- | --- |
| accept_visitor(v:FSEventVisitor):void {abstract} | All classes implementing FSEvent must be able to accept a FSEventVisitor. FSEventVisitors classes will fully implement the FSEventVisitor abstract class. The accept_visitor( ) method is a part of the implementation of the Visitor Pattern. Each concrete subclass of FSEvent will need to add a method interface to the FSEventVisitor class. The concrete subclass will then implement an accept_visitor where it will call that method, passing an instance of itself. |
| get_event_kind( ):FSEventKind_t {abstract} | Specific implementations of get_event_kind( ) must return their own FSEventKind_t. |
| create_event(system_event:FILE_NOTIFY_INFORMATION, | Create an event from a FILE_NOTIFY_INFORMATION |

TABLE XI-continued

| METHODS | DESCRIPTION |
| --- | --- |
| base_directory:string):FSEvent | struct. The appropriate subclass of FSEvent will be created. |
| Event Action | Description |
| FILE_ACTION_ADDED | The specified file was added to the file system |
| FILE_ACTION_REMOVED | The specified file was removed from the file system |
| FILE_ACTION_MODIFIED | The specified file was modified |
| FILE_ACTION_RENAMED_OLD_NAME | The specified file was renamed. This event contains the old file name |
| FILE_ACTION_RENAMED_NEW_NAME | The specified file was renamed. This event contains the new file name |
| Event Action | Resulting subclass of FSEvent |
| FILE_ACTION_ADDED | FSAddEvent |
| FILE_ACTION_REMOVED | FSRemoveEvent |
| FILE_ACTION_MODIFIED | FSModifyEvent |
| FILE_ACTION_RENAMED_OLD_NAME and FILE_ACTION_RENAMED_NEW_NAME | FSRenameEvent |
| get_file_name( ):string | Returns the full filename (path included) for this event. |
| get_old_file_name( ):string | Returns the full original_filename (path included) for this event. If the event did not result in the file being renamed, then get_old_file_name( ) will return the same result as get_file_name( ). |
| get_event_time( ):long | Get the time this event occurred. |
| same_file(other_event:FSEvent):bool | Check if other_event refers to the same file. |

Each FSEvent will typically be characterized by an Action attribute specifying the type of event which has occurred (i.e., the type of event received from the operating system 306), as well as the identity of the file with which such event is associated. Table XII summarizes a list of exemplary Actions.

TABLE XII

| EVENT ACTION | DESCRIPTION |
| --- | --- |
| FILE_ACTION_ADDED | The specified file was added to the file system |
| FILE_ACTION_REMOVED | The specified file was removed from the file system |
| FILE_ACTION_MODIFIED | The specified file was modified |
| FILE_ACTION_RENAMED_OLD_NAME | The specified file was renamed. This event contains the old file name |
| FILE_ACTION_RENAMED_NEW_NAME | The specified file was renamed. This event contains the new file name |

Upon being received from the operating system 306, each file system event is mapped to a corresponding subclass of FSEvent class. An exemplary mapping of file system events to subclasses of FSEvents is set forth below in Table XIII.

TABLE XIII

| EVENT ACTION | RESULTING SUBCLASS OF FSEVENT |
| --- | --- |
| FILE_ACTION_ADDED | FSAddEvent |
| FILE_ACTION_REMOVED | FSRemoveEvent |
| FILE_ACTION_MODIFIED | FSModifyEvent |
| FILE_ACTION_RENAMED_OLD_NAME and FILE_ACTION_RENAMED_NEW_NAME | FSRenameEvent |

It is noted that FILE_ACTION_RENAMED_OLD_NAME and FILE_ACTION_RENAMED_NEW_NAME events will typically be combined into on FSRenameEvent. Accordingly, when a FILE_ACTION_RENAMED_OLD_NAME is received, the existing or "old" file name is saved and combined with the file name specified in FILE_ACTION_RENAMED_NEW_NAME in order to create an FSRenameEvent.

Turning now to Table XIV, the parameter FSEventKind_t constitutes an enumeration of the types of specific implementations of FSEvents.

TABLE XIV

| FSEVENTKIND | SPECIFIC FSEVENT |
| --- | --- |
| FSEventKind_NONE | N/A |
| FSEventKind_ADD | FSAddEvent |
| FSEventKind_REMOVE | FSRemoveEvent |
| FSEventKind_MODIFY | FSModifyEvent |
| FSEventKind_RENAME | FSRenameEvent |
| FSEventKind_SYNCHRONIZE | FSSynchronizeEvent |

The FSEventVisitor abstract class defines methods that will be called by concrete FSEvent classes in their accept_visitor method. Classes wishing to participate as an FSEventVisitor must implement the FSEventVisitor methods. Table XV describes the function of various methods associated with the abstract FSEventVisitor class. Applicants note that the use of "Visitor" objects consistent with a "Visitor Pattern" is described by Gamma et al., *Elements of Reusable Object-Oriented Software*, Addison-Wesley (1995), which is hereby incorporated by reference in its entirety.

TABLE XV

| METHODS | DESCRIPTION |
| --- | --- |
| visitAddEvent(event:FSAddEvent):void {abstract} | Method called by FSAddEvent.accept_visitor( ). The calling FSAddEvent object will be passed as the event parameter. |
| visitRemoveEvent(event:FSRemoveEvent):void {abstract} | Method called by FSRemoveEvent.accept_visitor( ). The calling FSRemoveEvent object will be passed as the event parameter. |
| visitModifyEvent(event:FSModifyEvent):void {abstract} | Method called by FSModifyEvent.accept_visitor( ). The calling FSModifyEvent object will be passed as the event parameter. |
| visitRenameEvent(event:FSRenameEvent):void {abstract} | Method called by FSRenameEvent.accept_visitor( ). The calling FSRenameEvent object will be passed as the event parameter. |

TABLE XV-continued

| METHODS | DESCRIPTION |
| --- | --- |
| visitSynchronizeEvent(event:FSSynchronizeEvent):void {abstract} | Method called by FSSynchronizeEvent.accept_visitor( ). The calling FSSynchronizeEvent object will be passed as the event parameter. |

FSRenameEvent is a concrete subclass of FSEvent which implements an FSEvent for processing the renaming of a file. In the exemplary embodiment FSRenameEvent always operates on two files: an original_filename and a new filename. The original_filename is the name of a file prior to the renaming operation, and the new filename is the name of the file 110 following such operation. Table XVI and Table XVII respectively describe the functions of a constructor and various methods associated with the FSRenameEvent subclass.

TABLE XVI

| CONSTRUCTOR | DESCRIPTION |
| --- | --- |
| FSRenameEvent(filename:string, original_filename:string) | Constructs a FSRenameEvent for the passed filename and original_filename. |

TABLE XVII

| METHODS | DESCRIPTION |
| --- | --- |
| accept_visitor(v:FSEventVisitor):void | Implementation of the abstract method accept_visitor from FSEvent. This implementation passes an instance of itself to v.visitRenameEvent( ). |
| get_event_kind( ):FSEventKind_t | returns FSEventKind_RENAME |
| same_file(other_event:FSEvent):bool | Check if other_event refers to the same file. Since this is part of a rename, same_file( ) checks if the events are both referring to the same get_old_file_name( ). |

FSModifyEvent is a concrete subclass of FSEvent which implements an FSEvent for processing a modification to a file. Table XVIII and Table XIX respectively describe the functions of constructors and various methods associated with the FSModifyEvent subclass.

TABLE XVIII

| CONSTRUCTORS | DESCRIPTION |
| --- | --- |
| FSModifyEvent(filename:string, original_filename:string) | Constructs a FSModifyEvent for the passed filename and original_filename. As a result of net effects processing, the file may have started out with an original_filename and this name is preserved by using this constructor. |
| FSModifyEvent(path:string) | Constructs an FSModifyEvent for the passed filename. |

TABLE XIX

| METHODS | DESCRIPTION |
| --- | --- |
| accept_visitor(v:FSEventVisitor):void | Implementation of the abstract method accept_visitor from FSEvent. This implementation passes an instance of itself to v.visitModifyEvent( ). |
| get_event_kind( ):FSEventKind_t | returns FSEventKind_MODIFY |

FSAddEvent is a concrete subclass of FSEvent which implements an FSEvent for processing the an addition of a file to the file system. Table XX and Table XXI respectively describe the functions of constructors and various methods associated with the FSAddEvent subclass.

TABLE XX

| CONSTRUCTORS | DESCRIPTION |
| --- | --- |
| FSAddEvent(filename:string, original_filename:string) | Constructs a FSAddEvent for the passed filename and original_filename. As a result of net effects processing, the file may have started out with an original_filename and this name is preserved by using this constructor. |
| FSAddEvent(filename:string) | Constructs an FSModifyEvent for the passed filename. |

TABLE XXI

| METHODS | DESCRIPTION |
| --- | --- |
| accept_visitor(v.FSEventVisitor):void | Implementation of the abstract method accept_visitor from FSEvent. This implementation passes an instance of itself to v.visitAddEvent( ). |
| get_event_kind( ):FSEventKind_t | Returns FSEventKind_ADD |

FSRemoveEvent is a concrete subclass of FSEvent which implements an FSEvent for processing the removal of a file from the file system. Table XXII and Table XXIII respectively describe the functions of constructors and various methods associated with the FSRemoveEvent subclass.

TABLE XXII

| CONSTRUCTORS | DESCRIPTION |
| --- | --- |
| FSRemoveEvent(filename.string, original_filename;string) | Constructs a FSRemoveEvent for the passed filename and original_filename. As a result of net effects processing, the file may have started out with an original_filename and this name is preserved by using this constructor. |
| FSRemoveEvent(filename:string) | Constructs an FSRemoveEvent for the passed filename. |

TABLE XXIII

| METHODS | DESCRIPTION |
| --- | --- |
| accept_visitor(v:FSEventVisitor):void | Implementation of the abstract method accept_visitor from FSEvent. This implementation passes an instance of itself to v.visitRemoveEvent( ). |
| get_event_kind( ):FSEventKind_t | returns FSEventKind_REMOVE |

FSSynchronizeEvent is a concrete subclass of FSEvent. Unlike the other subclasses of FSSynchronizeEvent, in the exemplary embodiment FSSynchronizeEvent is not created as a direct result of a file system event, but rather as a product of the net effects of multiple file system events. An FSSynchronizeEvent can be used to cause the contents of the filename to be synchronized with the CM system 102 (called through accept_visitor( )). Table XXIV and Table XXV respectively describe the functions of a constructor and various methods associated with the FSSynchronizeEvent subclass.

TABLE XXIV

| CONSTRUCTOR | DESCRIPTION |
| --- | --- |
| FSSynchronizeEvent(filename: string) | Constructs an FSRemoveEvent for the passed filename. |

TABLE XXV

| METHODS | DESCRIPTION |
| --- | --- |
| accept_visitor(v:FSEventVisitor):void | Implementation of the abstract method accept_visitor from FSEvent. This implementation passes an instance of itself to v.visitSynchronizeEvent( ). |
| get_event_kind( ):FSEventKind_t | returns FSEventKind_SYNCHRONIZE |

Figure 18:
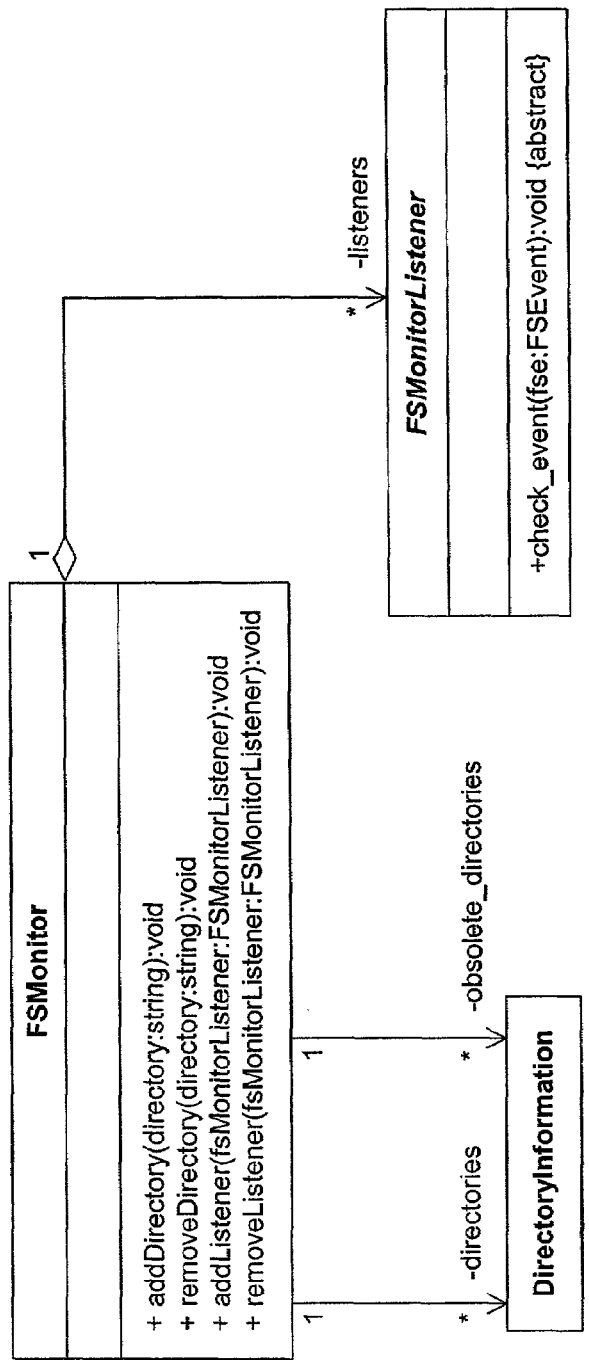
FIG. 18 is a class diagram representative of an FSMonitor class.

Turning now to FIG. 18, a class diagram representative of the FSMonitor class is provided. The FSMonitor class manages registering directories with the file system event manager of the operating system 306, and handles initial processing of file system events. When FSMonitor is notified of a file system event, it calls FSEvent.create_event( ) to create a concrete FSEvent. The FSEvent is then passed to each of the registered FSMonitorListeners for processing. Table XXVI and Table XXVII respectively describe the functions of a constructor and various methods associated with the FSMonitor class.

TABLE XXVI

| CONSTRUCTORS | DESCRIPTION |
| --- | --- |
| FSMonitor( ) | Constructs an FSMonitor( ). |

TABLE XXVII

| METHODS | DESCRIPTION |
| --- | --- |
| addDirectory(directory:string):void | Inform the operating system 306 to begin monitoring the passed directory. |
| removeDirectory(directory:string):void | inform the operating system 306 to stop monitoring the passed directory. |
| addListener(fsMonitorListener:FSMonitorListener):void | Add the passed fsMonitorListener to the list of listeners to be informed of FSEvents. |
| removeListener(fsMonitorListener:FSMonitorListener); void | Remove the passed fsMonitorListener from the list of listeners. |

Figure 19:
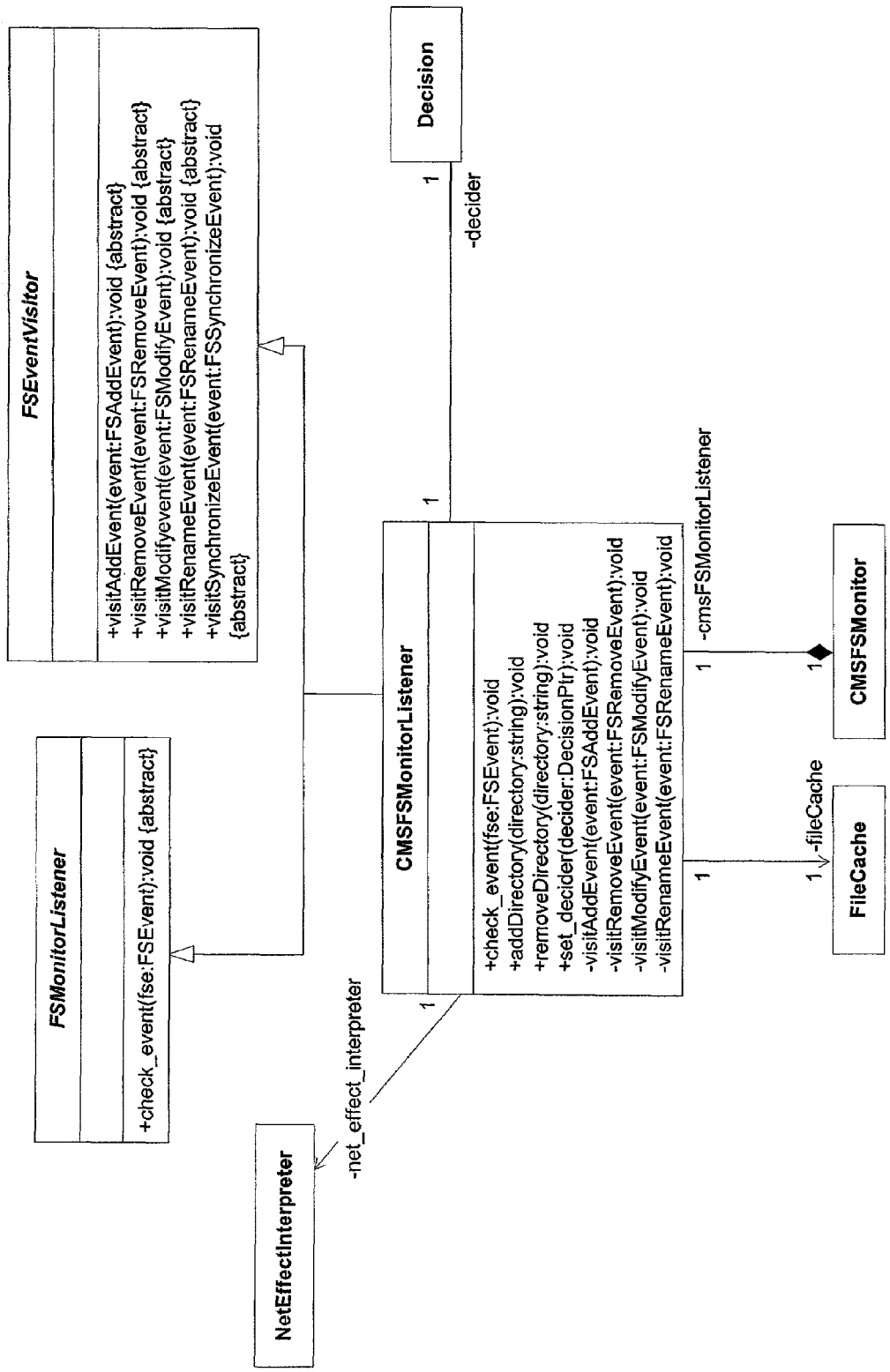
FIG. 19 is a class diagram representative of an CMSFS-MonitorListener class.

FIG. 19 is a class diagram representative of the CMSFSMonitorListener class. The CMSFSMonitorListener class is responsible for processing FSEvents and turning them into CM commands executable by the CM system 102. CMSFSMonitorListener implements the FSMonitorListener interface and the FSEventVisitor interface. As a FSMonitorListener, CMSFSMonitorListener will respond to check_event( ) messages from FSMonitor. As an FSEventVisitor, CMSFSMonitorListener will submit active CM commands based on the specific FSEventVisitor method. Table XXVIII and Table XXIX respectively describe the functions of a constructor and various methods associated with the FSMonitor class.

TABLE XXVIII

| CONSTRUCTOR | DESCRIPTION |
| --- | --- |
| CMSFSMonitorListener(cmsFsMonitor:CMSFSMonitor) | Constructs a CMSFSMonitorListener. The passed CMSFSMonitor is saved as part of the persistent state and is used internally. |

TABLE XXIX

| METHODS | DESCRIPTION |
| --- | --- |
| check_event(fse:FSEvent):void | Puts the passed FSEvent on the Net Effects event queue. See FIG. 4-CMSFSMonitorListener Sequence Diagram. |
| addDirectory(directory:string):void | CMSFSMonitorListener is the maintainer of the FileCache. The addDirectory( ) method asks the CMSFSMonitor for the file cache and then adds the contents of the passed directory to the file cache. |
| removeDirectory(directory:string):void | CMSFSMonitorListener is the maintainer of the FileCache. The addDirectory( ) method asks the CMSFSMonitor for the file cache and then removes the contents of the passed directory from the file cache. |
| visitAddEvent(event:FSAddEvent):void | visitAddEvent( ) turns the passed FSAddEvent into a CM operation. See Table 1-FSEvent to CM Command Mapping. Before running the CM operation, the event is sent through the Filter. |
| visitRemoveEvent(event:FSRemoveEvent):void | visitRemoveEvent ( ) turns the passed FSRemoveEvent into a CM operation. See Table 1-FSEvent to CM Command Mapping. Before running the CM operation, the event is sent through the Filter. |
| visitModifyEvent(event:FSModifyEvent):void | visitModifyEvent ( )turns the passed FSModifyEvent into a CM operation. See Table 1-FSEvent to CM Command Mapping. Before running the CM operation, the event is sent through the Filter. |
| visitRenameEvent(event:FSRenameEvent):void | visitRenameEvent ( ) turns the passed FSRenameEvent into a CM operation. Before running the CM operation, the event is sent through the Filter. |
| visitSynchronizeEvent(event:FSSynchonizeEvent):void | visitSynchronizeEvent ( ) turns the passed FSSynchonizeEvent into a CM operation. See, e.g., Table I. Before running the CM operation, the event is sent through the Filter. |

Figure 20:
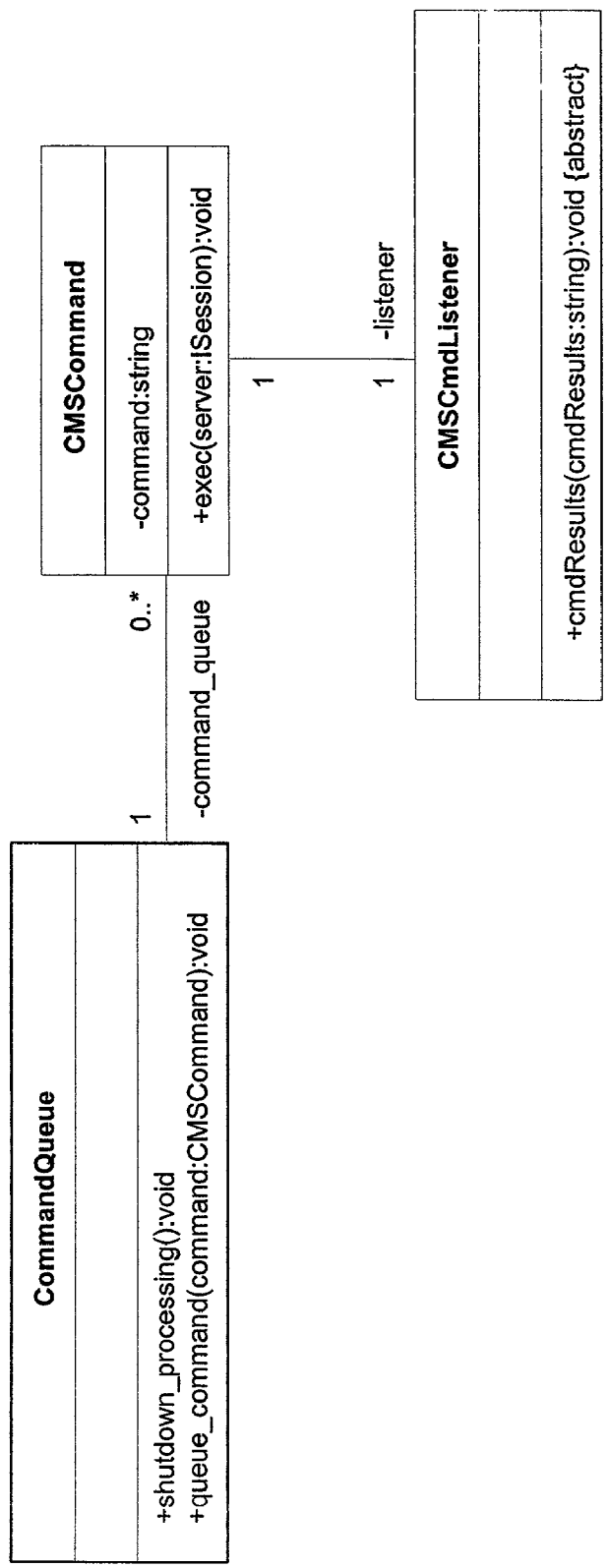
FIG. 20 is a class diagram representative of a Command-Queue class.

FIG. 20 is a class diagram representative of the CommandQueue class. Table XXX and Table XXX1 respectively describe the functions of a constructor and various methods associated with the CommandQueue class.

TABLE XXX

| CONSTRUCTOR | DESCRIPTION |
| --- | --- |
| CMSFSMonitorListener(cmsFsMonitor:CMSFSMonitor) | Constructs a CMSFSMonitorListener. The passed CMSFSMonitor is saved as part of the persistent state and is used internally. |

TABLE XXXI

| METHODS | DESCRIPTION |
| --- | --- |
| shutdown_processing( ):void | Terminates command thread. |
| queue_command(command:CMSCommand):void | Place the passed CMSCommand into the queue. |

Table XXXII and Table XXXIII respectively describe the functions of a constructor and various methods associated with a CMSCommand class, which when instantiated serves as an object to represent a command string executable by the CM system 102.

TABLE XXXII

| CONSTRUCTORS | DESCRIPTION |
| --- | --- |
| CMSCommand(command:string, listener:CMSCmdListener) | Constructs a CMSCommand with the passed command string. Listener and priority. The command string is the actual CM command which will be processed. The listener will process the results of the command. |

TABLE XXXIII

| METHODS | DESCRIPTION |
| --- | --- |
| exec(server:lsession) | Execute the cm command using server. The results of the command will be passed to listener. cmdResults( ) |

CMSCmdlistener is an abstract class defining an interface for calling a method that will accept the results of a CMSCommand. Table XXXIV describes the functions of various methods associated with the CMSCmdlistener class.

TABLE XXXIV

| METHODS | DESCRIPTION |
| --- | --- |
| cmdResults(cmdResults:string out):void {abstract} | |

Figure 21:
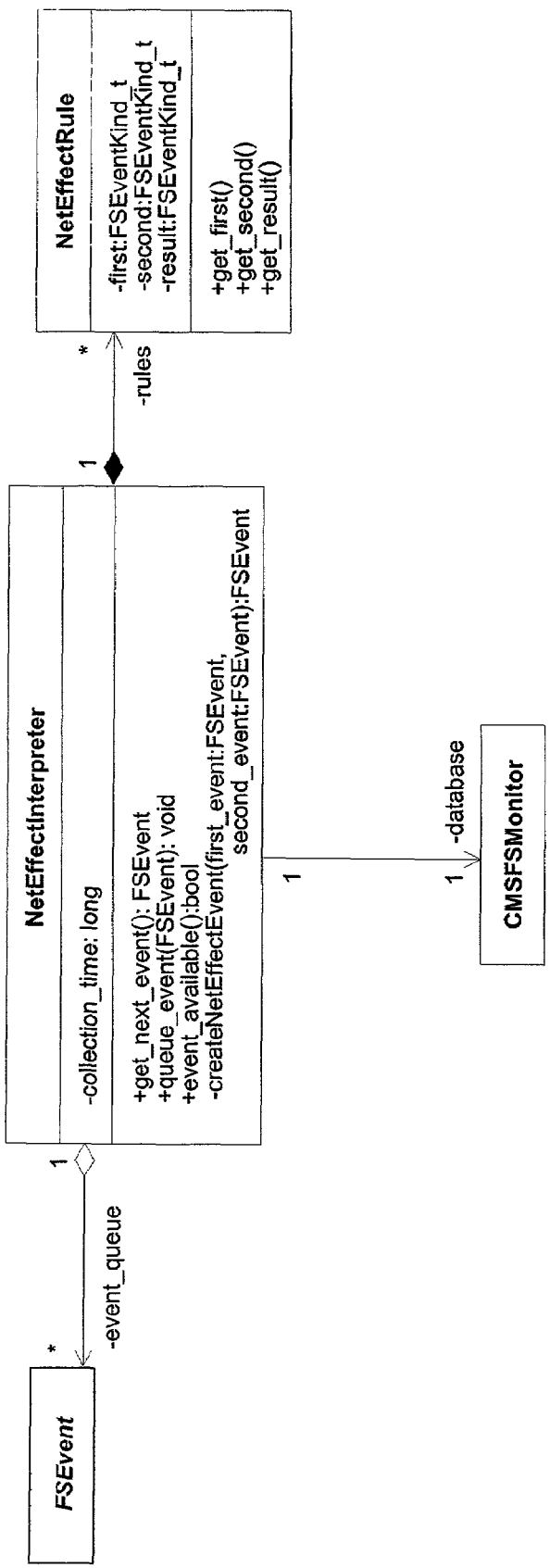
FIG. 21 is a class diagram representative of a NetEffectInterpreter class.

FIG. 21 is a class diagram representative of the NetEffectInterpreter class. The NetEffectInterpreter class implements an interpreter that maps two FSEvents for the same file into a single combined event. Table XXXV and Table XXXVI respectively describe the functions of a constructor and various methods associated with the NetEffectInterpreter class. In addition, Table XXXVII provides an exemplary set of mappings of pairs of FSEvents into single resultant FSEvents.

TABLE XXXV

| CONSTRUCTORS | DESCRIPTION |
| --- | --- |
| NetEffectInterpreter (cmsFsMonitor:CMSFSMonitor) | Constructs a NetEffectInterpreter. The passes CMSFSMonitor is stored as part of the NetEffectInterpreter's persistent state. |

TABLE XXXVI

| METHODS | DESCRIPTION |
| --- | --- |
| get_next_event( ): FSEvent | Pull the first event off of event_queue but only after the event is at least collection_time milliseconds old. |
| queue_event(FSEvent): void | Adds an event to the event queue 410 after applying net effects vs. all of events for the same file currently in the queue. |
| event_available( ):bool | Returns true is an event is available and ready to process. |
| createNetEffectEvent(first_event; FSEvent, second_event:FSEvent): FSEvent | Returns a new FSEvent based on the net effect of the first_event and the second_event. See Table 4-Net Effects. |

TABLE XXXVII

| FIRST EVENT KIND | Second Event Kind | RESULT EVENT KIND |
| --- | --- | --- |
| FSEventKind_ADD | FSEventKind_ADD | FSEventKind_ADD |
| FSEventKind_ADD | FSEventKind_REMOVE | FSEventKind_SYNC |
| FSEventKind_ADD | FSEventKind_MODIFY | FSEventKind_ADD |
| FSEventKind_ADD | FSEventKind_RENAME | FSEventKind_ADD |
| FSEventKind_ADD | FSEventKind_SYNC | FSEventKind_ADD |
| FSEventKind_REMOVE | FSEventKind_ADD | FSEventKind_MODIFY |
| FSEventKind_REMOVE | FSEventKind_REMOVE | FSEventKind_REMOVE |
| FSEventKind_REMOVE | FSEventKind_MODIFY | FSEventKind_MODIFY |
| FSEventKind_REMOVE | FSEventKind_RENAME | FSEventKind_RENAME |
| FSEventKind_REMOVE | FSEventKind_SYNC | FSEventKind_REMOVE |
| FSEventKind_MODIFY | FSEventKind_ADD | FSEventKind_MODIFY |
| FSEventKind_MODIFY | FSEventKind_REMOVE | FSEventKind_REMOVE |
| FSEventKind_MODIFY | FSEventKind_MODIFY | FSEventKind_MODIFY |
| FSEventKind_MODIFY | FSEventKind_RENAME | FSEventKind_RENAME |
| FSEventKind_MODIFY | FSEventKind_SYNC | FSEventKind_MODIFY |
| FSEventKind_RENAME | FSEventKind_ADD | FSEventKind_RENAME |
| FSEventKind_RENAME | FSEventKind_REMOVE | FSEventKind_REMOVE |

TABLE XXXVII-continued

| FIRST EVENT KIND | Second Event Kind | RESULT EVENT KIND |
|---|---|---|
| FSEventKind_RENAME | FSEventKind_MODIFY | FSEventKind_RENAME |
| FSEventKind_RENAME | FSEventKind_RENAME | FSEventKind_RENAME |
| FSEventKind_RENAME | FSEventKind_SYNC | FSEventKind_RENAME |
| FSEventKind_SYNC | FSEventKind_ADD | FSEventKind_ADD |
| FSEventKind_SYNC | FSEventKind_REMOVE | FSEventKind_REMOVE |
| FSEventKind_SYNC | FSEventKind_MODIFY | FSEventKind_MODIFY |
| FSEventKind_SYNC | FSEventKind_RENAME | FSEventKind_RENAME |
| FSEventKind_SYNC | FSEventKind_SYNC | FSEventKind_SYNC |

The foregoing description, for purposes of explanation, used specific nomenclature to provide a thorough understanding of the invention. However, it will be apparent to one skilled in the art that the specific details are not required in order to practice the invention. In other instances, well-known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the following claims and their equivalents define the scope of the invention.

What is claimed is:

1. A method for active configuration management of components of a data repository maintained in memory of a computer system, said method comprising:
creating a plurality of file system event objects in response to the occurrence of a corresponding plurality of events associated with ones of said components, wherein said components include at least one of computer programs, databases, and text documents;
entering said plurality of file system event objects into an event queue; and
executing a sequence of configuration management (CM) operations involving identified ones of said components on the basis of corresponding ones of said file system event objects.

2. The method of claim 1 further including setting a result time upon entry of a first of said file system event objects into said event queue, said first of said file system event objects being transferred from said event queue to a command queue upon expiration of said result time.

3. The method of claim 1 further including creating a new file system event object based upon first and second related ones of said file system event objects, said new file system event object replacing said first and second related ones of said file system event objects and being inserted into a predefined position within said event queue.

4. The method of claim 1 further including filtering said plurality of file system event objects in order to identify selected ones of said file system event objects to be monitored, said selected ones of said file system event objects being transferred from said event queue said command queue.

5. The method of claim 4 wherein said selected ones of said file system event objects includes said first of said file system event objects, said first of said file system event objects being transferred to said event queue to said command queue upon expiration of a result time associated with said first of said file system event objects.

6. The method of claim 4 wherein said sequence of configuration management operations are executed in response to a corresponding sequence of said selected ones of said file system event objects within said command queue.

7. The method of claim 1 further including comparing an additional file system event object associated with a first of said components to each of said plurality of file system 10 objects within said event queue and identifying one of said plurality of file system objects also associated with said first of said components, said one of said plurality of file system objects being replaced with a new file system object based upon said additional file system event object and said one of said plurality of file system objects.

8. The method of claim 1 wherein a first of said file system event objects is a ModifyEvent object indicative of modification of a first of said components into a modified component, said ModifyEvent object resulting in execution of a first of said CM operations disposed to synchronize said modified component with a preexisting version of said first of said components.

9. The method of claim 8 further including checking a directory structure in order to identify said preexisting version of said first of said components and determine whether said preexisting version of said first of said components is a controlled component.

10. The method of claim 8 further including augmenting a directory structure to include said modified component when said preexisting version of said first of said components is determined not to be a controlled component.

11. The method of claim 1 wherein a first of said file system event objects is a RemoveEvent object, said RemoveEvent object resulting in execution of a first of said CM operations disposed to remove a corresponding first of said components from a current project.

12. The method of claim 11 further including identifying said first of said components corresponds as a directory structure and deleting all subdirectories and files associated with said directory structure.

13. The method of claim 1 wherein a first of said file system event objects is a RenameEvent object, said RenameEvent object resulting in execution of one of said CM operations disposed to remove one of said components corresponding to said RenameEvent object from a current project when said one of said components is determined to be a controlled component.

14. The method of claim 13 wherein said one of said CM operations invokes another of said CM operations disposed to effect component synchronization when said one of said components is determined not to be a controlled component.

15. The method of claim 13 wherein said one of said CM operations invokes another of said CM operations disposed to effect component synchronization when a preexisting version of said one of said components is determined to exist in a work area.

16. A system comprising one or more processors for executing a plurality of instructions for active configuration management of components of a data repository maintained in memory of a computer system, said system comprising:
   a file system monitor module capable of being instantiated into a plurality of file system event objects in response to the occurrence of a corresponding plurality of events associated with ones of said components, wherein said components include at least one of computer programs, databases, and text documents;
   an event queue into which are entered said plurality of file system event objects;
   a listener module, in communication with said file system monitor module and said event queue, for generating a plurality of active configuration management (CM) commands on the basis of said plurality of file system event objects; and
   a command queue for storing said plurality of active CM commands, thereby facilitating execution of a corresponding plurality of configuration management (CM) operations involving said components.

17. The system of claim 16 further including means for setting a result time upon entry of a first of said file system event objects into said event queue, said first of said file system event objects being transferred from said event queue to a command queue upon expiration of said result time.

18. The system of claim 16 wherein said file system monitor module is operative to create a new file system event object based upon first and second related ones of said file system event objects, said new file system event object replacing said first and second related ones of said file system event objects and being inserted into a predefined position within said event queue.

19. The system of claim 16 further including filtering said plurality of file system event objects in order to identify selected ones of said file system event objects to be monitored, said selected ones of said file system event objects being transferred from said event queue said command queue.

20. A method for facilitating active configuration management of components of a data repository maintained in memory of a computer system, said method comprising:
   creating a plurality of file system event objects in response to the occurrence of a corresponding plurality of events associated with ones of said components, wherein said components include at least one of computer programs, databases, and text documents;
   entering said plurality of file system event objects into an event queue; and
   generating a plurality of active configuration management (CM) commands on the basis of said plurality of file system event objects, said plurality of active CM commands capable of being executed to perform a corresponding plurality of configuration management (CM) operations involving said components.

21. The method of claim 20 further including storing said plurality of active CM commands within a command queue.

22. The method of claim 21 further including setting a result time upon entry of a first of said file system event objects into said event queue, said first of said file system event objects being transferred from said event queue to said command queue upon expiration of said result time.

23. The method of claim 20 further including creating a new file system event object based upon first and second related ones of said file system event objects, said new file system event object replacing said first and second related ones of said file system event objects and being inserted into a predefined position within said event queue.

* * * * *